United States Patent
Lu et al.

(10) Patent No.: US 6,757,784 B2
(45) Date of Patent: Jun. 29, 2004

(54) HIDING REFRESH OF MEMORY AND REFRESH-HIDDEN MEMORY

(75) Inventors: Shih-Lien L. Lu, Portland, OR (US); Dinesh Somasekhar, Hillsboro, OR (US); Konrad Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 09/966,586

(22) Filed: Sep. 28, 2001

(65) Prior Publication Data

US 2003/0065884 A1 Apr. 3, 2003

(51) Int. Cl.[7] .............................................. G06F 12/00
(52) U.S. Cl. .................. 711/118; 711/106; 365/185.25; 365/189.04; 365/222
(58) Field of Search .............................. 711/118, 105, 711/106, 3, 5, 101; 365/189.04, 222, 185.11, 185.25; 714/752–754

(56) References Cited

U.S. PATENT DOCUMENTS

| | | | |
|---|---|---|---|
| 5,887,272 A | * 3/1999 | Sartore et al. | ............... 711/105 |
| 5,963,481 A | * 10/1999 | Alwais et al. | ......... 365/189.04 |
| 5,999,474 A | * 12/1999 | Leung et al. | ................ 365/222 |
| 6,125,425 A | 9/2000 | Cole et al. | |
| 6,188,626 B1 | 2/2001 | Chang | |
| 6,195,303 B1 | 2/2001 | Zheng | |
| 6,199,142 B1 | * 3/2001 | Saulsbury et al. | .......... 711/118 |
| 6,222,785 B1 | 4/2001 | Leung | |
| 6,330,636 B1 | * 12/2001 | Bondurant et al. | ......... 711/105 |

OTHER PUBLICATIONS

INTEL, Intel Hub Architecture: A revolution in Chipset Design, 2000 Intel Corporation, pp.–1.

* cited by examiner

*Primary Examiner*—Nasser Moazzami
(74) *Attorney, Agent, or Firm*—Blakely, Sokoloff, Taylor & Zafman LLP

(57) ABSTRACT

The present invention is in the field of memory architecture and management. More particularly, the present invention provides a method, apparatus, system, and machine-readable medium to hide refresh cycles of a memory array such as dynamic random access memory.

15 Claims, 22 Drawing Sheets

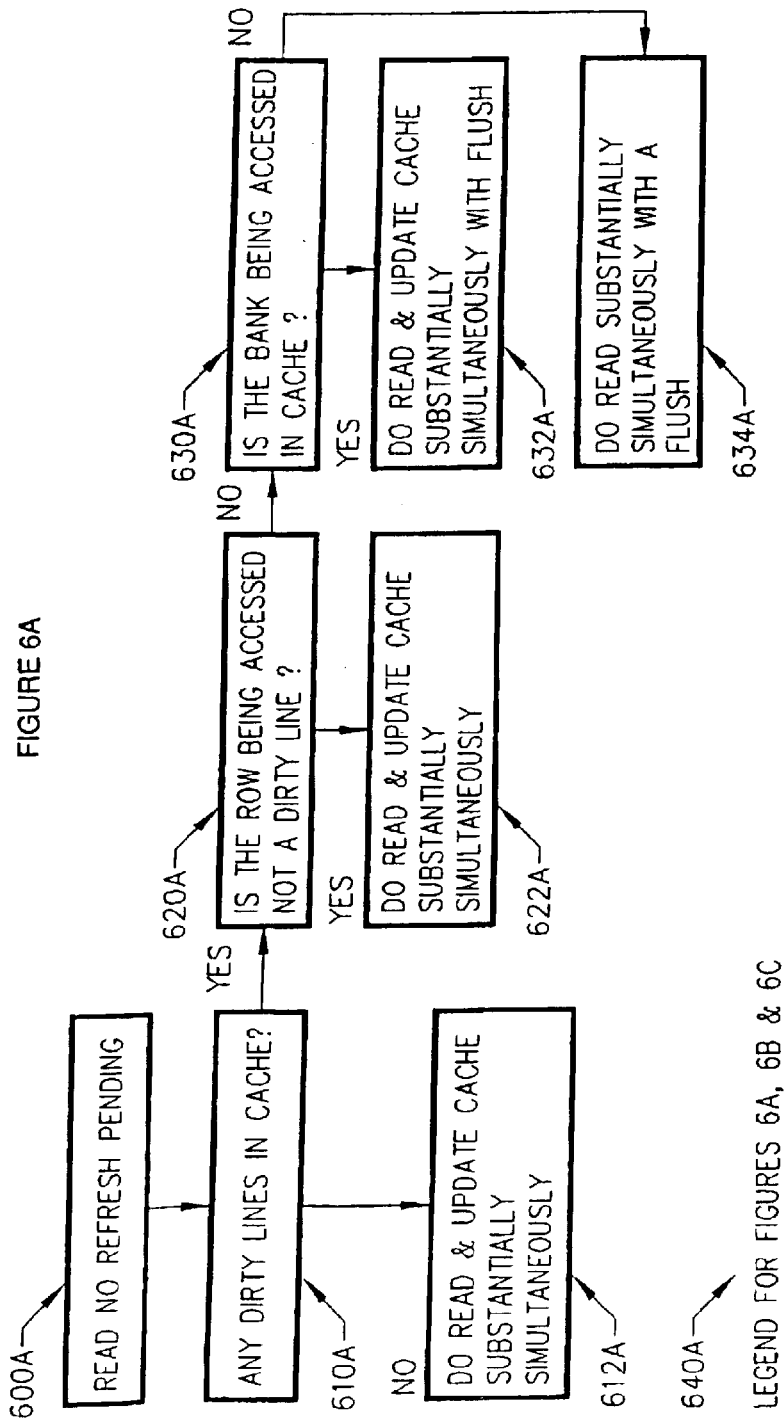

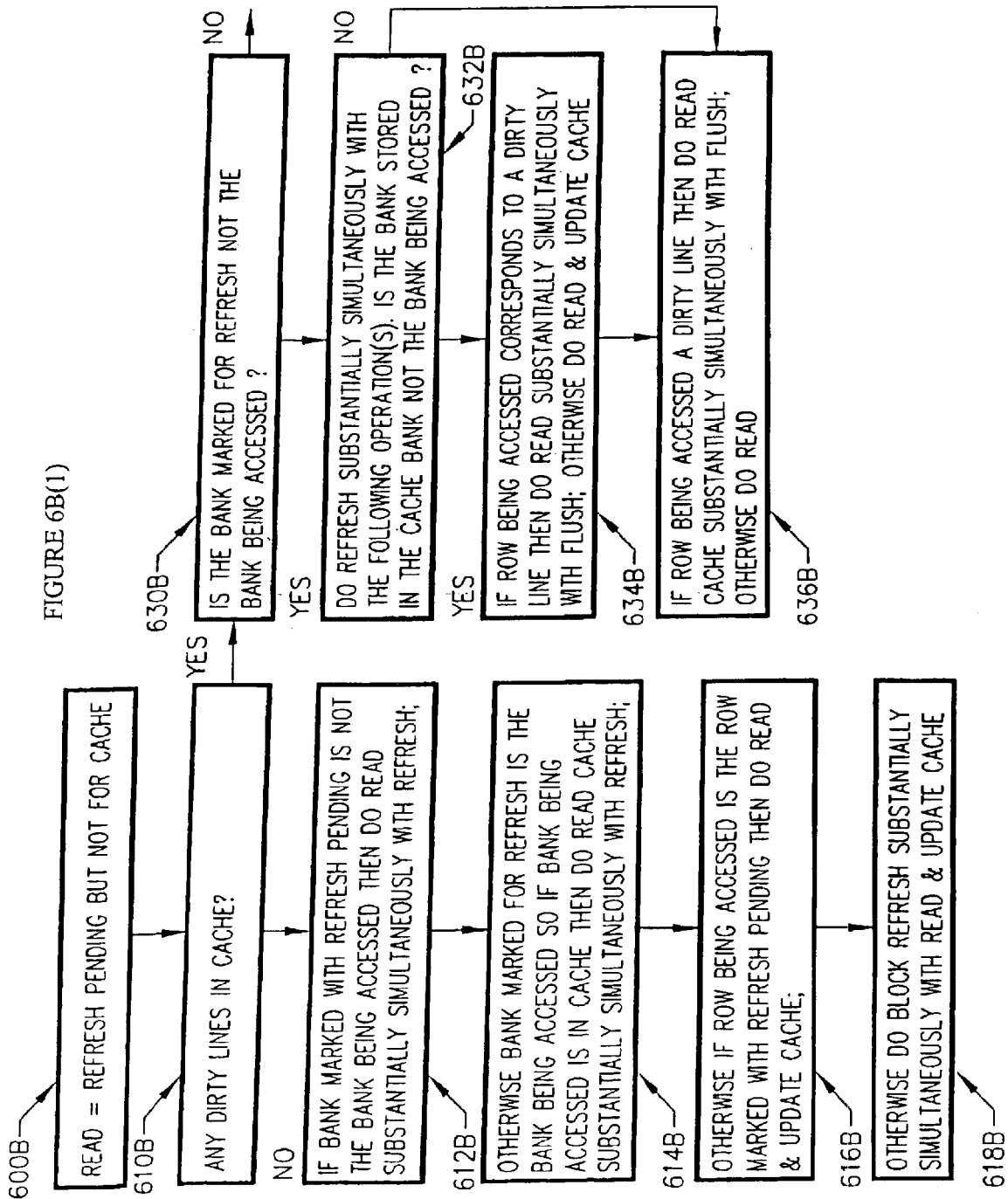
FIGURE 6B(1)

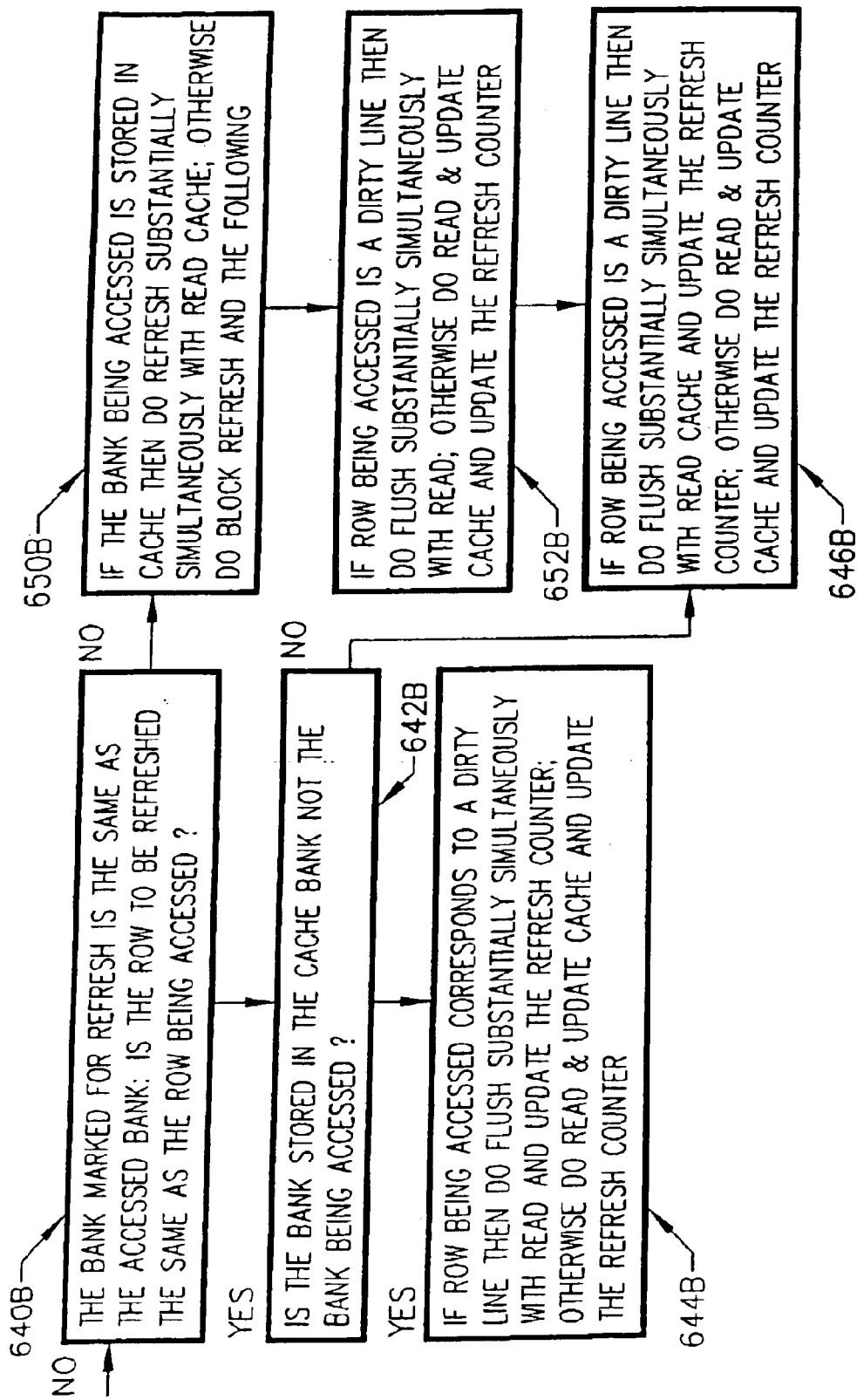
FIGURE 6B(2)

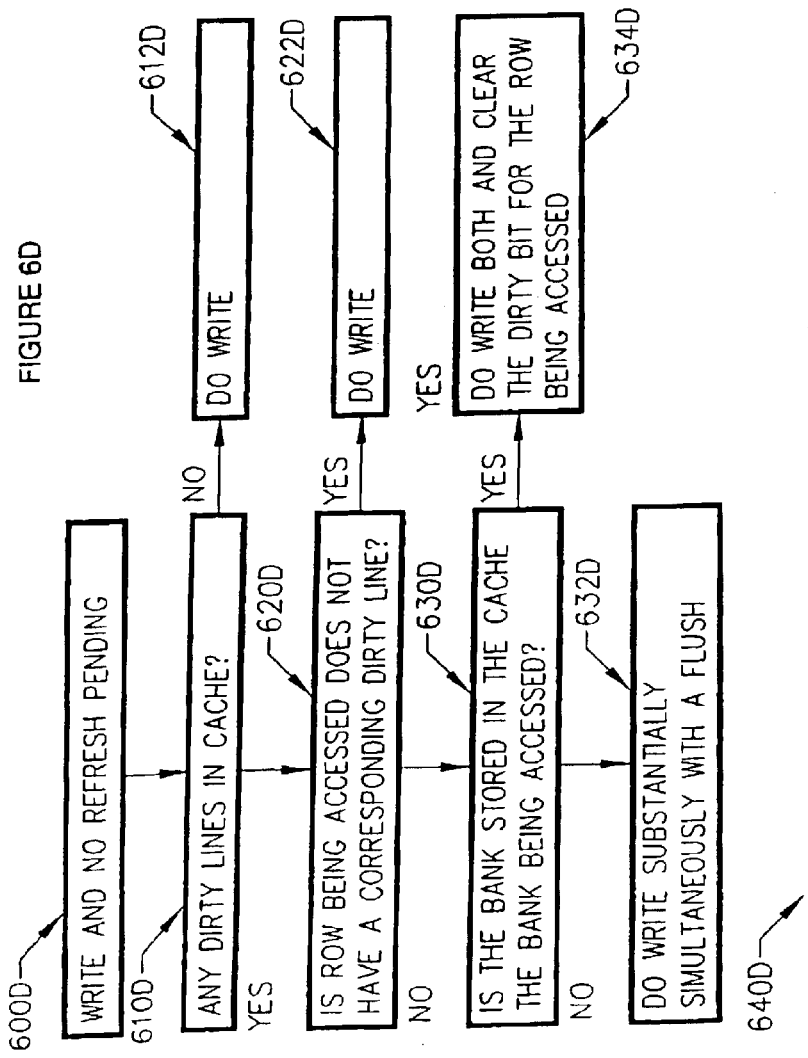

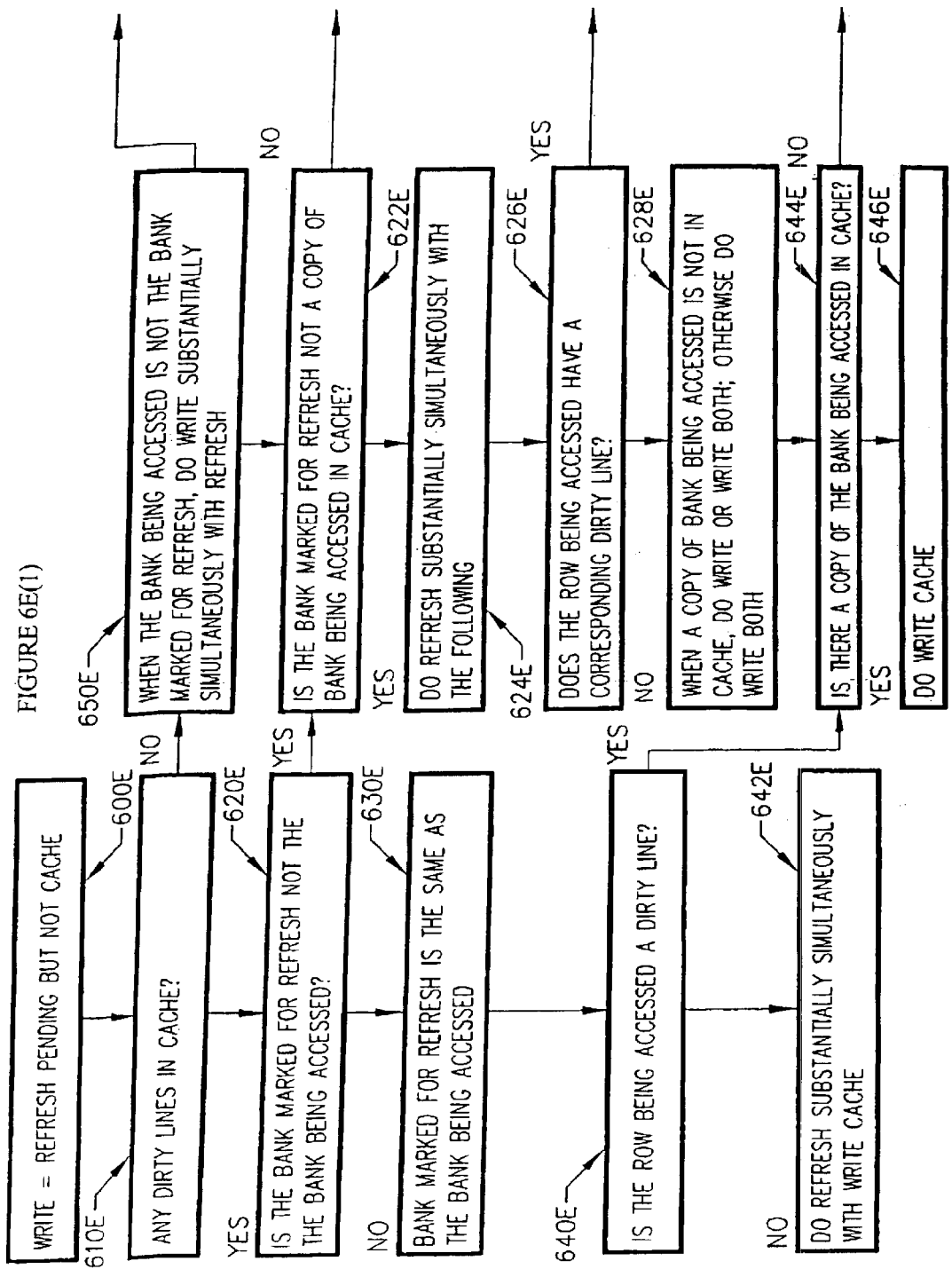
FIGURE 6E(1)

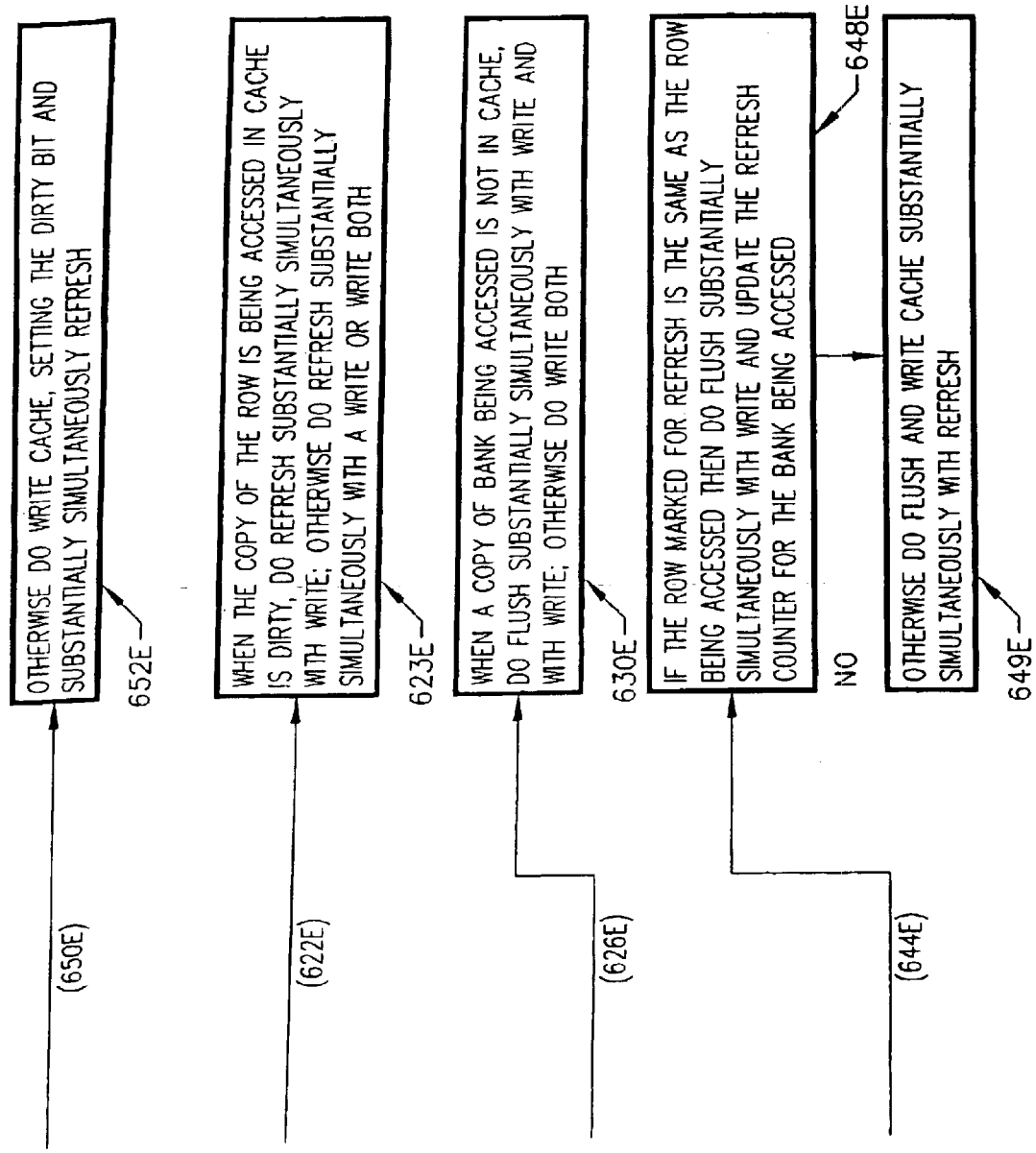
FIGURE 6E(2)

FIGURE 7A

INPUTS

Refresh Counter:         rb, rr  /* refresh bank, refresh row */
Current Access Address:  wb, wr /* access (write) bank and row */
Number of rows in a bank: row

BUFFERS

Valid[row]          /* valid bits for each of the rows in the cache bank*/

Dirty[row]          /* dirty bits for cache lines*/
Cache[row]          /* cache bank */
Cachetag[row]       /* Tag for cache lines */

FUNCTIONS

```
Refresh()     {mem[rb, rr] = mem[rb, rr]; }
Flush()       {mem[cachetag[wr], wr] = cache[wr] $$ dirty[wr] = 0;}
              /* WB dirty line */
ReadUpdateC() {data_out = mem[wb, wr] $$ cache[wr] = mem[wb, wr]
              $$ cachetag[wr] = wb; }
Read()        {data_out = mem[wb, wr]; }
Write()       {mem[wb, wr] = data_in; }
ReadCache()   {data_out = cache[wr] $$ cache[wr] = cache[wr];}
WriteCache()  {cache[wr] = data_in $$ cachetag[wr] = wb $$ dirty[wr] = 1;}
WriteBoth()   {Write() $$ Writecache()$$ dirty[wr] = 0; }
              /* write to both the cache and memory */
```

($$ - means operations are done in parallel)

PSEUDO PROGRAM DESCRIPTION

```
/* Initialize all cachetags to be NULL */
Cachetag[*] = NULL;

/*** READ ***/

/*--------- No refresh pending --------- */
if (no refresh pending) {
        if (no dirty line) {ReadUpdateC(); }
        else /* there is a dirty line */ {
                if (!dirty[wr]) { ReadUpdateC();}
                else if (wb == cachetag[wr]) { ReadCache() $$ Flush() $$ dirty[wr] = 0; }
                        else { Read() $$ Flush(); }
```

FIGURE 7B

```
/* ---------Refresh pending --------*/
else {
        If (rb != cache) {
                If (no dirty line) {
                        if (rb != wb) { Read() $$ Refresh(); }
                        else { /* rb == wb */
                                if (wb == tag[wr])
                                        { ReadCache() $$ Refresh(); }
                                else {
                                        if (wr == rr) ReadUpdateC();
                                        else Block_refresh $$ ReadUpdateC();
                                }
                        }
                }
                else /* there is a dirty line */
                        if (rb != wb) {
                                Refresh() $$
                                if (tag[wr] != wb) {
                                        if (dirty[wr]) { Flush() $$ Read();}
                                        else ReadUpdateC();
                                }
                                else {
                                        if (dirty[wr]) { ReadCache() $$ Flush();}
                                        else Read();
                                }
                        } /* end if rb != wb */
                        else { /* refresh bank is the same as the accessed bank */
                                if ( wr == rr) {
                                        if (tag[wr] != wb) {
                                                if (dirty[wr]) {Flush() $$ Read()
                                                        $$ UpdateRefreshCounter(); }
                                                else {ReadUpdateC() $$ Update Refresh
                                        Cntr();}
                                        }
                                        else {
                                                if (dirty[wr]) { ReadCache() $$ Flush()
                                                        $$ UpdaterefreshCntr;}
                                                else { ReadUpdateC() $$
                                        UpdateRefreshCounter();}
                                        }
                                }
                                else {
                                        if (tag[wr] == wb) { Refresh() $$ ReadCache();}
                                        /* dirty status for the line unchanged */
                                        else {
                                                BlockRefresh;
                                                if (dirty[wr]) { Flush() $$ Read(); }
                                                else ReadUpdateC();
                                        }
                                }
                        }
                } /* end else there is a dirty line */
        } /* end if rb != cache */
```

FIGURE 7C

```
else /* the cache bank is being refreshed */ {
        if (dirty[wr]) {
                if (tag[wr] == wb) {
                        BlockRefresh;
                        ReadCache() $$ Flush();
                }
                else {
                        BlockRefresh;
                        Read() $$ Flush();
                }
        }
        else {
                Refresh()
                Read()
        }
    }
} /* end refresh pending */
```

FIGURE 7D

```
/*** WRITE ***/

/* ------ No pending refresh -------- */
if (no refresh pending) {
        /* there is no dirty line */
        if (no dirty line) {Write(); }
        else {  /* there is a dirty line */
                if (!dirty[wr])  { Write();}
                else {
                        if (Cachetag[wr] == wb) { WriteBoth() $$ dirty[wr] = 0; }
                        else {Write() $$ Flush();}
                }
        } /* end dirty line */
}
```

FIGURE 7E

```
/* ------- Pending refresh ------- */
else {
    if (rb != cache) {
        if (no dirty line) {
            if (wb != rb) { Write() $$ Refresh() }
            else { WriteCache() $$ dirty[wr] = 1 $$ Refresh() ;}
        }
        else {  /* there is a dirty line */
            if (rb != wb) { /* refresh bank is different from the access bank */
                if (rb != cachetag[wr]) {
                    Refresh() $$
                    If (dirty[wr]) {
                        If (cachetag[wr] != wb) {Flush() $$ Write();}
                        Else {Writeboth();}
                    }
                    else {
                        If (cachetag[wr] != wb) { Write();} /* or writeboth() */
                        Else {Writeboth();}
                    }
                }
                else {
                    if (dirty[wr]) { Refresh() $$ Write();} /* cache line remains dirty */
                    else { Refresh() $$ Write() ;} /* Or writeboth() */
                }
            }
            else { /* refresh bank is the same as the access bank */
                If (dirty[wr]) {
                    If (cachetag[wr] == wb) { Writecache();}
                    else {
                        if (wr == rr) {/* lucky day*/
                            Flush() $$ write() $$ Updaterefreshcounter;
                        }
                        else {
                            Flush() and write to cache with new data ;
                            $$ Refresh();
                        }
                    }
                }
                else { /* the line is not dirty */
                    /* create another dirty line */
                    Refresh $$
                    WriteCache();
                }
            }
        }
    }
}
```

FIGURE 7F

```
else { /* cache bank is being refreshed */
        Write() $$
        if (dirty[wr]) {
                if (cachetag[wr] == wb) {
                        Refresh() $$
                        Cachetag[wr] = NULL;
                }
                else {
                        Refresh();
                        /* unless wr = rr then we writeback and clear dirty bit */
                }
        }
        else { /* not dirty */
                Refresh();
                if (cachetag[wr] == wb) { Cachetag[wr] = NULL;}
        }
    }
}
```

HIDING REFRESH OF MEMORY AND REFRESH-HIDDEN MEMORY

FIELD OF INVENTION

The present invention is in the field of memory architecture and management. More particularly, the present invention provides a method, apparatus, system, and machine-readable medium to hide refresh cycles of a memory array.

BACKGROUND

The current trend of processor has been to include more memory hierarchy on-chip to reduce average latency and to satisfy bandwidth requirements. Traditionally on-chip caches are implemented with static random access memory (SRAM) rather than dynamic access memory (DRAM). However, each SRAM cell consists of six transistors, consuming a significant amount of semiconductor area whereas each DRAM cell may comprise a single access transistor coupled to a capacitor to store charge. Thus, DRAM may consume less area for the same amount of data storage.

Using logic DRAM or embedded DRAM to implement on-chip caches, for instance, can be a good alternative from the standpoint of memory density, but DRAM cells need to be refreshed periodically, postponing access to the DRAM. Postponing access during refresh cycles may result in variable latencies, increasing the complexity of a memory or cache interface. For example, a processor may require additional interface circuitry to receive an indication when an access may be performed or to retry requests for access of a DRAM device. Therefore, SRAM is used in conjunction with DRAM to alleviate some of the complexity of memory interfacing while compromising on memory density.

BRIEF FIGURE DESCRIPTIONS

In the accompanying drawings, like references may indicate similar elements:

FIG. 6a–f depict detailed flowcharts of embodiments to hide refresh cycles.

FIGS. 7a–f depict example pseudo code embodiments to hide refresh cycles.

Figure 8:
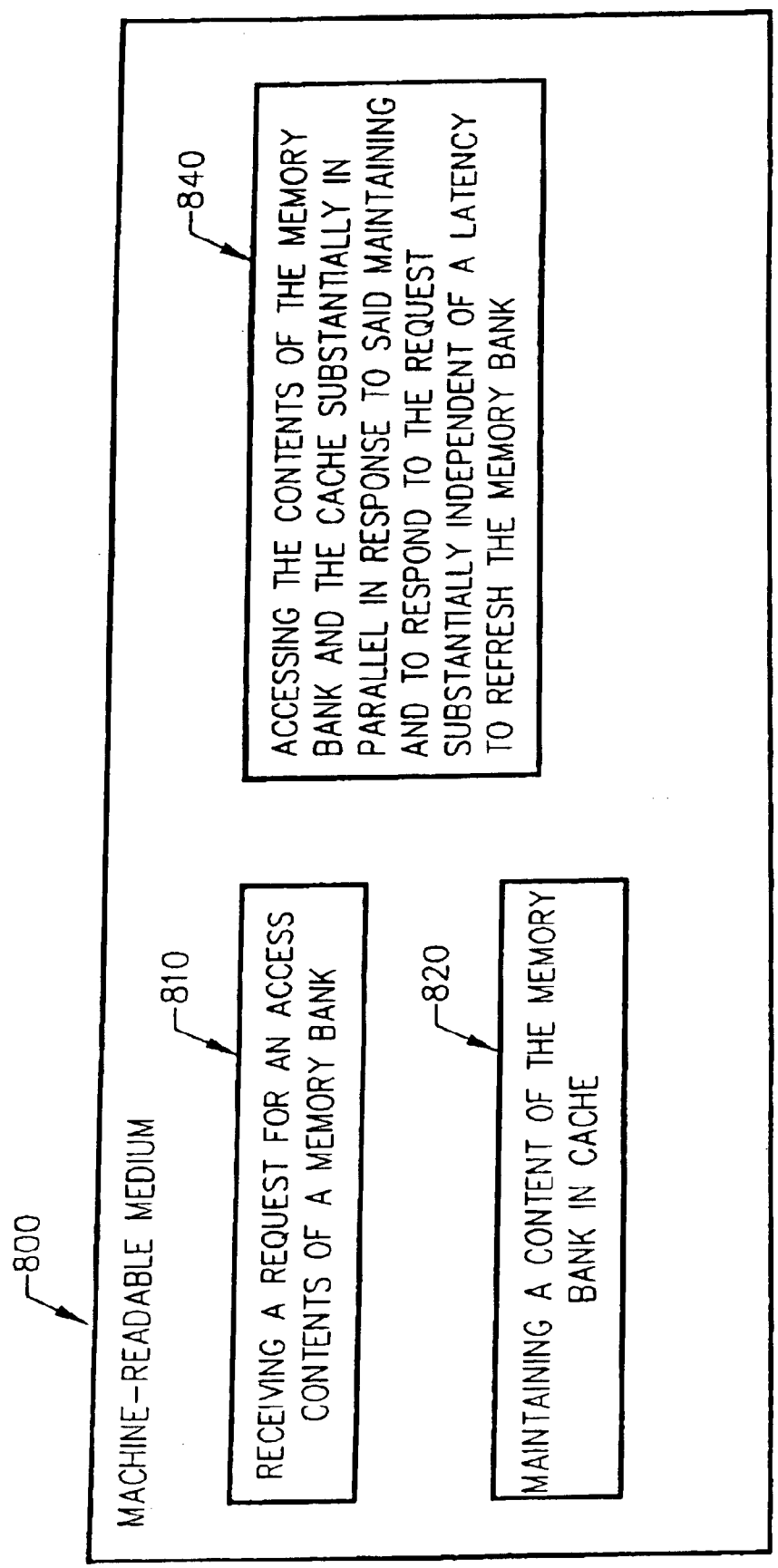

FIG. 8 depicts a machine-readable medium comprising instructions to hide refresh cycles.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
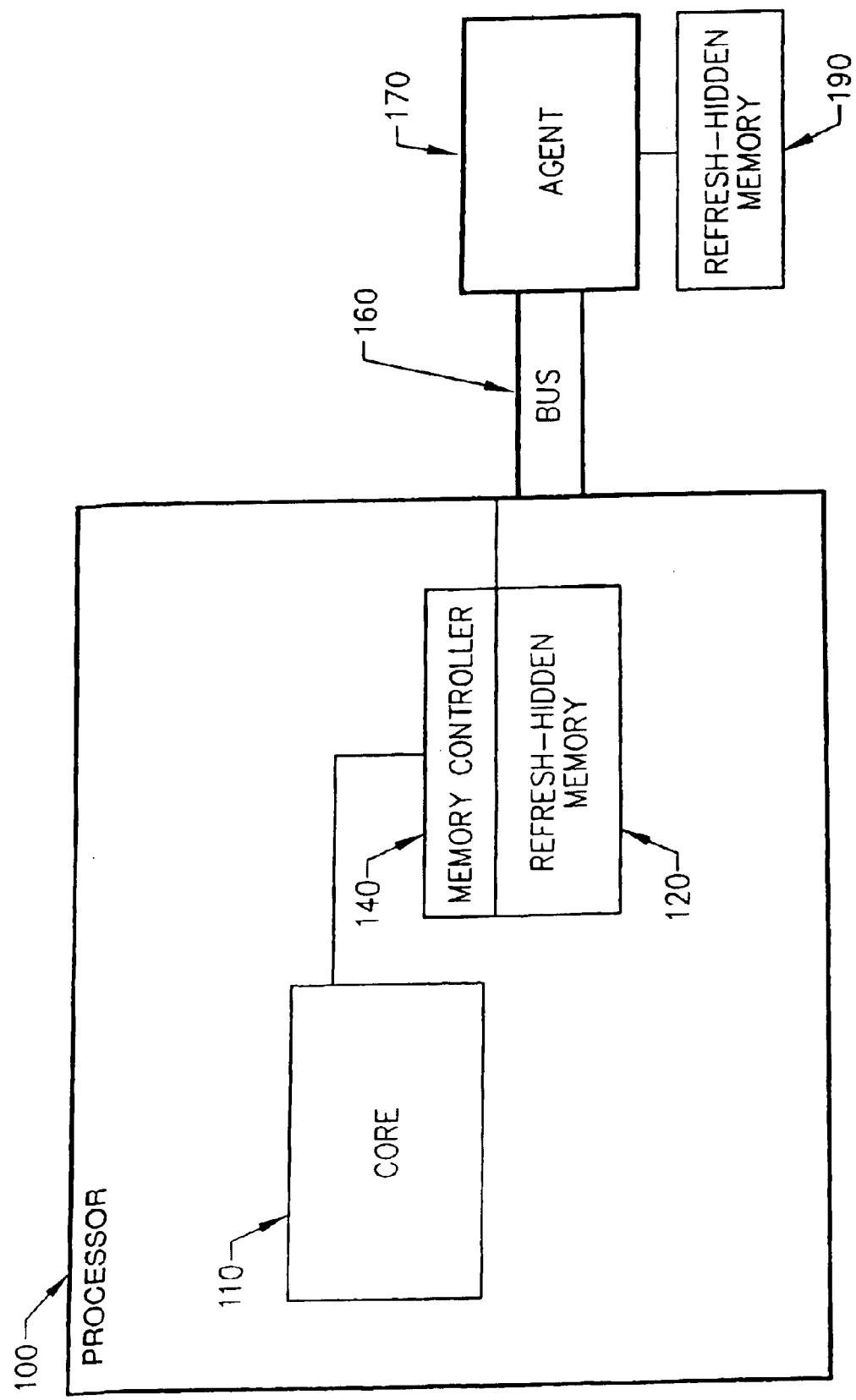
FIG. 1 depicts a processor comprising embedded refresh-hidden memory coupled to an agent and refresh-hidden memory via a bus.

In particular, FIG. 1 depicts a processor 100 comprising embedded refresh-hidden memory 120 coupled to an agent 170 via a bus 160 and refresh-hidden memory 190 via agent 170. Processor 100 may be a general-purpose central processing unit for a personal computer or a personal digital assistant for example. Processor 100 may comprise core 110 coupled to refresh-hidden memory 120 via a memory controller 140, such as a cache controller. The core 110 may be coupled to the refresh-hidden memory 120 to maintain data or instructions frequently accessed by the core 110. In some embodiments, processor 100 may be part of, or encompass, a multiple-processor (MP) system. In a MP system, for instance, more than one processor may refresh-hidden memory, such as refresh-hidden memory 120, and refresh-hidden memory 190 may service more than one processor.

Agent 170, may comprise circuitry such as north bridge and south bridge or a memory controller hub and input-output (I/O) controller hub, and may be coupled to processor 100 via bus 160 to request processor 100 to perform tasks such as floating-point arithmetic and logical operations or to decode and execute instructions. For example, agent 170 may forward an instruction for processor 100 to execute via bus 160. The instructions may cause processor 100 to access refresh-hidden memory 190 to obtain data or code to execute the instruction from agent 170. In some embodiments, refresh-hidden memory 120 may comprise modified data to be written to refresh-hidden memory 190 so processor 100 may access the modified data and, in many embodiments, agent 170 may access refresh-hidden memory 190 directly. Core 110 may store the data or code retrieved from system memory in refresh-hidden memory 120 to facilitate faster access to the data or code when agent 170 makes a similar or the same request.

Refresh-hidden memory 120 may comprise memory cells that should be refreshed periodically to maintain data stored in a memory element of the memory cell. The refresh cycles may be hidden to a device accessing the memory since refresh-hidden memory 120 may have a substantially consistent latency for access of less than a refresh cycle. Refresh-hidden memory 120 may comprise a cache memory bank coupled to a memory bank via more than two global buses and comprise a memory controller coupled to the more than two global buses. In some embodiments, refresh-hidden memory 120 may also comprise a tag buffer coupled to a row decoder to maintain an association between a line of memory in the cache and a line of memory in a memory bank. In still further embodiments, the refresh-hidden memory 120 may comprise a dirty bit buffer to indicate when a line of memory in the cache is newer than a corresponding line of memory in a memory bank. In other embodiments, the tag buffer and/or dirty bit buffer may be incorporated in the cache.

The cache may be a memory bank (dedicated for cache in some embodiments) coupled to a second memory bank via more than two global buses to maintain access to the contents of the second memory bank when the second memory bank is unavailable for access. The second memory bank may be unavailable for access when a refresh is pending or during a refresh cycle. For example, when a memory bank is being refreshed and refresh-hidden memory 120 receives an access request to that memory bank, the access request may be satisfied by accessing the cache. When the access is a write request, the data may be written to the cache and associated with the source, the memory bank and row. After the memory bank becomes available, the data written to the cache may be written to the memory bank via the more than two global buses. In some situations, when a refresh is pending for a memory bank and a write request is made for that memory bank, the refresh may be blocked and data may be written to the memory bank.

On the other hand, when an access is a read request for data in a memory bank being refreshed, the data may be read from the cache to satisfy the read request. For example, after reading a line of a memory bank, a copy of that line may be stored in the cache. The next time an access requests reading that line during a refresh or pending refresh of the memory bank, the data may be retrieved from the cache version of the memory line of that bank. In some situations, refresh of a memory bank may be blocked to read a line of memory in response to the request as well as write the line into the cache.

The more than two global buses of refresh-hidden memory 120 may be designed to facilitate using a cache to maintain a consistent access latency. More than two global buses may comprise a global bus to couple one or more caches to one or more memory banks. More than two global buses may also be coupled memory controller 140 to coordinate swaps between the cache and the memory bank.

In some embodiments, the more than two global buses may comprise two pair of global buses to maintain an operation in the cache and an operation in a memory bank substantially simultaneously. For example, memory controller 140 may coordinate reading data from one memory bank onto a first global bus pair while writing data to a cache bank from the second global bus pair. In other embodiments, three global buses may be used instead of two global bus pairs by taking advantage of the binary quality of the data on two of the global buses. For instance, data to be written on a memory bank may be on a pair of global buses and an indication of a one or zero from a second memory bank may be on the third global bus to be written to a cache. A circuit coupled to the cache and to the third global bus may determine that the binary information to be written to the cache is the same as the data on the first pair of global buses so the cache may write the data from the first pair of global busses. On the other hand, the circuit may determine that the binary information to be written to the cache is the compliment of the information on the first pair of global data buses and XOR logic may be used to write the compliment of the data from the first pair of buses to the cache bank.

The memory controller 140 may comprise logic to coordinate writing data to a cache to avoid delaying access to a memory bank. For example, memory controller 140 may handle multiple consecutive writes to the same memory bank and the multiple consecutive writes may conflict with a refresh of that memory bank. The memory controller 140 may write each of the consecutive writes to cache during a refresh of the memory bank and set a dirty bit for each line written to cache to indicate that the cache line for that memory bank is newer than the data stored in the memory bank. The memory controller 140 may swap the memory in the cache with the first memory bank substantially simultaneously with an access of a different memory bank. For example, the memory controller 140 may flush data from the cache to a first memory bank substantially simultaneously with writing to a second memory bank.

Memory controller 140 may also handle a refresh conflict arising when consecutive reads are made to the same memory bank. For example, when multiple consecutive reads are requested from a first memory bank, a refresh is pending for the first memory bank, and the cache is full of data to update a second memory bank, the memory controller 140 may block the refresh to the first memory bank to satisfy the access request and write the data to the cache bank. Substantially simultaneously, the memory controller 140 may update a row or line of the second memory bank with the cache. More particularly, when the first bank comprises 10 rows or lines of memory, the refresh of the first memory bank may be blocked for 10 cycles while the cache is flushed and populated with the contents of the first memory bank.

In some embodiments, the cache may comprise portions of one or more memory banks. Several of these embodiments comprise a tag buffer and logic associated with the multiple cache portions to allow the multiple cache portions to function substantially like a single bank of memory. In alternative embodiments, the cache(s) may comprise more than one memory bank, operating as a single bank or divided into categories such as code, data, logical bank(s) serviced, and/or agent(s) serviced. For example, a cache, or portion thereof, may act as cache for memory banks one through five, a second cache may store cache for two agents that represent a high percentage of the cache requirements, and a third cache may handle the remaining cache requirements. In several of these embodiments, memory controller 140 may distribute available cache based upon actual use.

Many embodiments implement direct mapping for the cache in the refresh-hidden memory. When direct mapping to cache, each memory location is mapped to a single cache line that the memory location shares with many other memory locations. The memory locations may compete for the cache line so one of the many addresses that share the cache line may use the cache line at a given time. Thus, direct mapping of cache may allow circuitry of the memory controller 140 to check for hits quickly with a non-complex design. For example, when the cache comprises the same number of lines as each memory bank, the Nth line of the cache may service the Nth line of every memory bank. Therefore, when a request for an access is received, the memory controller 140 may determine whether the line corresponding to the access address is stored in cache by comparing the tag associated with the line number of the access, against the bank address of the access.

Other embodiments may implement fully associative cache mapping for the cache in the refresh-hidden memory 120 and 190. Fully associative cache mapping may allow any memory location to be stored in any cache line. However, the fully associative cache mapping may comprise complex search algorithms to check for a hit. Even so, fully associative cache mapping may offer a better hit ratio for the same size cache.

Further embodiments may compromise between direct mapping and fully associative mapping for hits and hit ratio by implementing an N-way set associative cache mapping for cache in the refresh-hidden memory 140 and 190. N-way set associative cache mapping may split the cache into sets of "N" cache lines, wherein each set may be shared by any memory address.

Some embodiments may comprise blocking cache and some comprise non-blocking cache. Blocking caches may handle one outstanding request at a time. After a cache miss, the cache may wait for the system memory or refresh-hidden memory 190 to supply the data. A non-blocking cache, on the other hand, may have the ability to work on other requests while waiting for system memory to supply data for misses.

Many embodiments may cache both data and processor instructions without distinction. However, some embodiments may split the cache, having a cache for code and a separate cache for data. One way may be more efficient than the other based upon the application.

Figure 2:
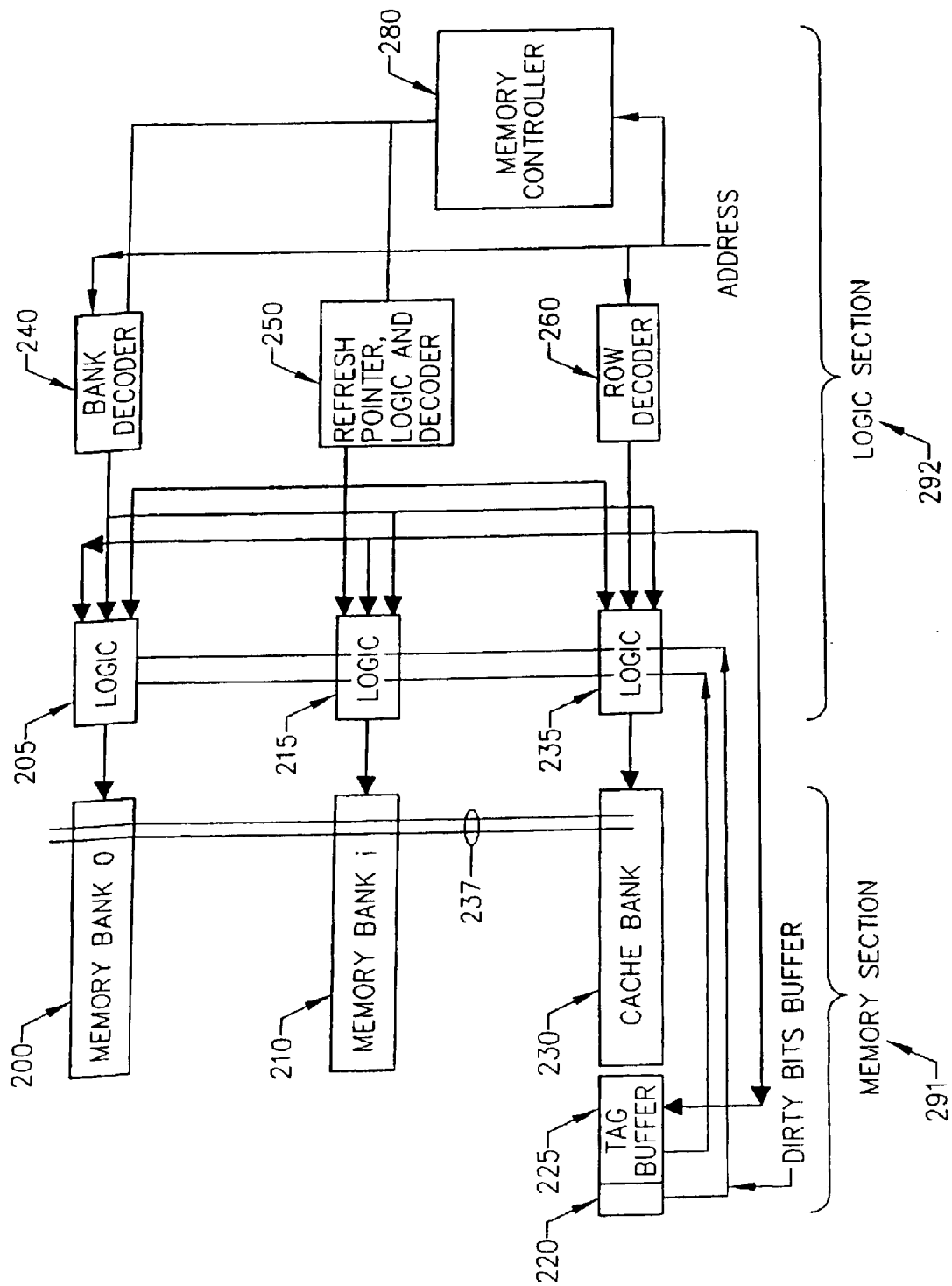
FIG. 2 depicts an embodiment of refresh-hidden memory.

Referring now to FIG. 2, there is shown an embodiment of refresh-hidden memory. The refresh-hidden memory comprises a memory section 291 and a logic section 292. The memory section 291 comprises memory bank 200, memory bank 210, and cache bank 230. The memory banks 200 and 210, and cache bank 230 may comprise dynamic memory. Memory banks 200 and 210 may store and retrieve data in response to access requests. Cache bank 230 maybe coupled to memory banks 200 and 210 to swap lines of memory via more than two global buses 237. Tag buffer 225 may associate a tag with lines in cache bank 230 to track the source (e.g. memory bank and row) of the cache line. Further, tag buffer 225 may comprise memory for dirty bits buffer 220 to indicate when a cache line in cache bank 230 may comprise data to write to the source. For example, when an access to write data to a line of a memory bank conflicts with a refresh of the memory bank, memory controller 280 may write the data to cache bank 230 and set a dirty bit for the cache line. At the next available cycle, memory controller 280 may write the data from the cache line to the memory bank.

A logic section 292 of the refresh-hidden memory may comprise a memory controller 280; a bank decoder 240; a refresh pointer, logic and decoder 250; a row decoder 260 and local address decoders 205, 215, and 235. The bank decoder 240 may comprise logic to decode a bank portion of an address, for instance, to distinguish an address of memory bank 200 from an address of memory bank 210. The row decoder 260 may decode a second portion of an address from an access request, comprising a row address, and logic 205, 215, or 235 may decode local bank addresses, depending upon the memory bank associated with the address. Further, selecting a row in a memory bank and the tag buffer may provide access to a cache line associated with the memory bank. In other embodiments, row decoder 260 may comprise logic to decode tags in tag buffer 225 to determine an association between a line in cache bank 230 and a memory bank 200 or memory bank 210.

Logic 205, 215 or 235 may determine which memory bank may be accessed. In the present embodiment, logic 205, 215 or 235 may receive information from bank decoder 240; refresh-pointer, logic, and decoder 250; and TAG buffer 225 to determine the memory bank to access, by selecting the enabled signal from either the refresh-pointer, logic, and decoder 250 or the row decoder 260. Memory controller 280 may further contain logic to coordinate the transfer of data between banks through the more than two global buses 237.

Refresh pointer, logic and decoder 250 may comprise logic to determine when a row in memory bank 200, memory bank 210, and cache bank 230 may be refreshed. The memory banks may be refreshed in a sequence so the pointer may comprise a number indicating the next memory bank and row to be refreshed. The logic of refresh pointer, logic and decoder 250 may determine when to initiate a refresh for a memory bank and refresh the memory bank. In some embodiments, the logic may further determine when a pending refresh for a memory bank and row may be blocked. Lastly, the decoder of refresh pointer, logic and decoder 250 may decode the memory bank and row indicated by the pointer to initiate a refresh cycle and to compare the pointer address to an address of an access or to a tag associated with a line of cache.

Memory controller 280, in response to receiving a request for an access to a memory bank, may determine an action depending upon the value of a tag in the tag buffer 225, the bank field of the address of the access request, and, when a refresh is pending, the bank field of the refresh pointer. The memory controller 280 may access the tag buffer, compare the tag buffer to the bank address, and compare the tag buffer 225 to the refresh pointer from refresh pointer, logic and decoder 250. Memory controller 280 may substantially avoid conflicts between an access to a memory bank and a refresh as determined by refresh pointer, logic and decoder 250. In some embodiments, memory controller 280 may be designed to resolve some conflicts between a refresh and an access by blocking the refresh for a number of cycles.

Figure 3:
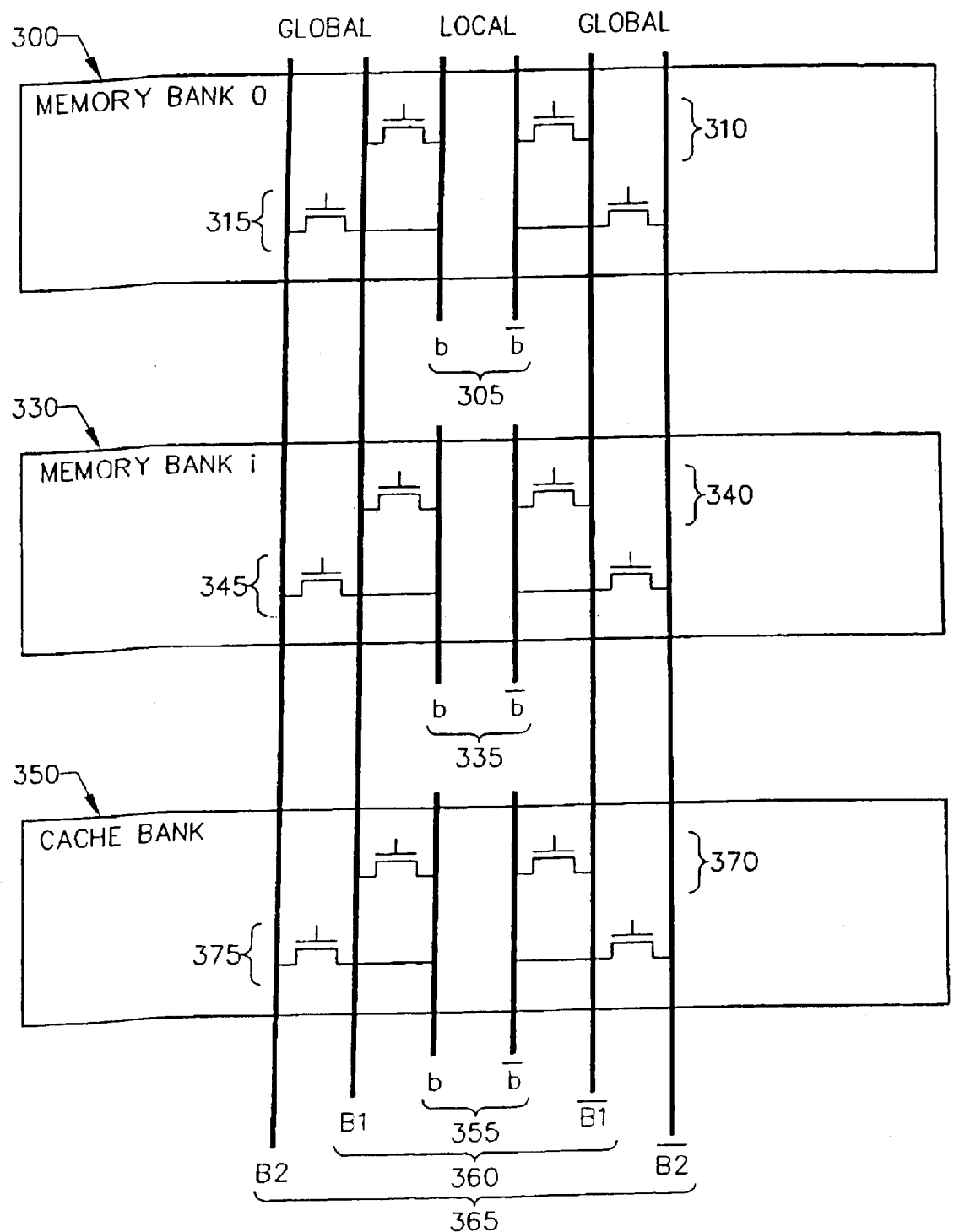
FIG. 3 depicts an embodiment of global bussing to hide refresh cycles.
Figure 4:
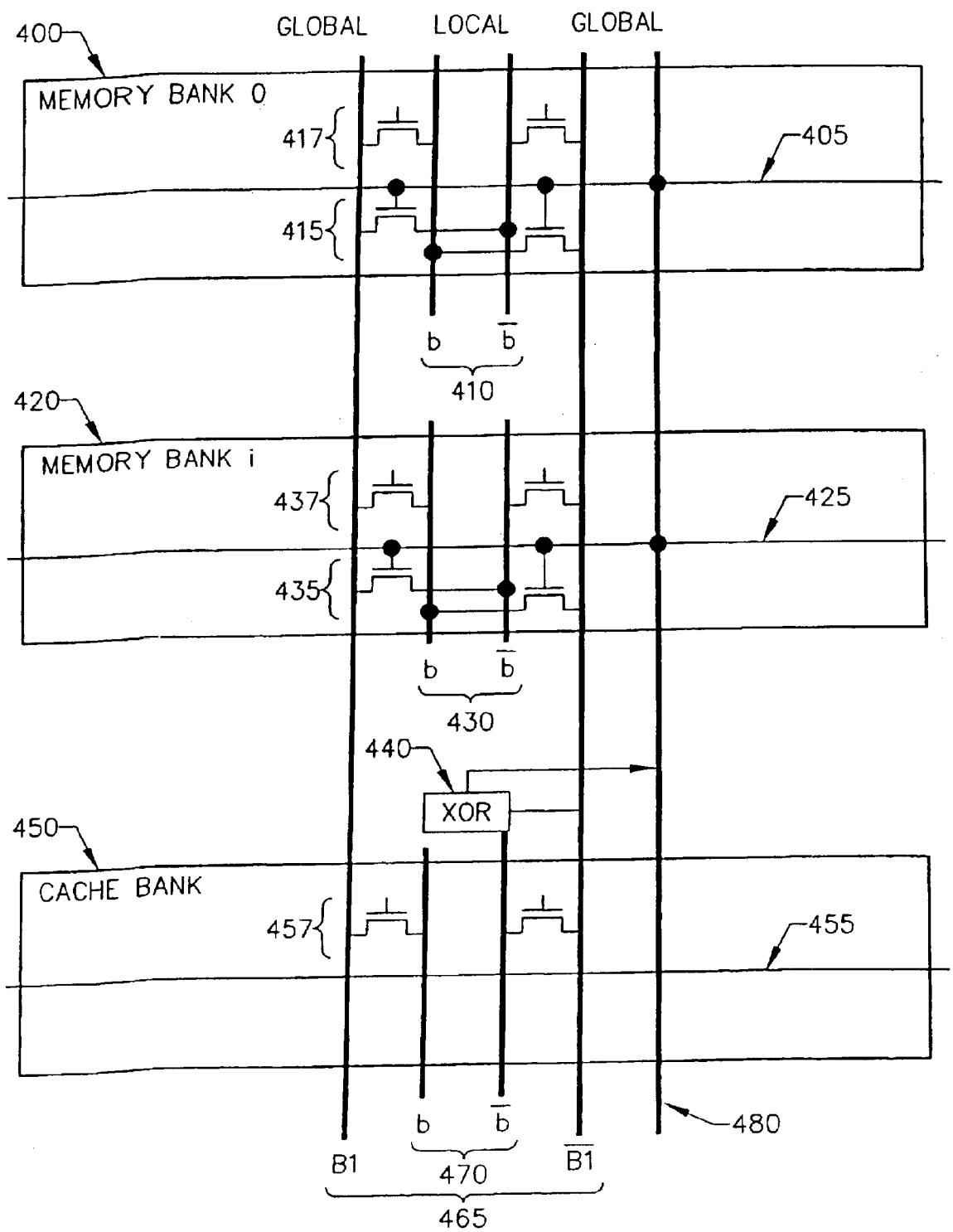
FIG. 4 depicts another embodiment of global bussing to hide refresh cycles.

Memory controller 280 may swap memory of a memory bank such as memory banks 200 and 210 with cache bank 230 via more than two global buses 237. For example, a swap operation may comprise two actions: (1) a read from memory bank 200 and write to cache bank 230 substantially simultaneously; and (2) a read from the cache bank 230 and a write to memory bank 210 substantially simultaneously. In some embodiments, for example, the two actions may be completed within a single cycle. The more than two global buses 237 may provide a means to carry out these operations and may be designed differently depending upon the application. FIGS. 3 and 4 show a couple example embodiments for the more than two global buses 237.

In some embodiments, the memory controller 280 may be capable of receiving an instruction to update the memory bank(s) with the contents of the cache, e.g. flushing the cache. Flushing the cache may be done to synchronize the cache and the memory bank(s) so there is no stale data.

Referring now to FIG. 3 there is shown an example of more than two global buses comprising two pair of global buses. The embodiment comprises a first pair of global buses 360, B1 and B1 BAR, and a second pair of global buses 365, B2 and B2 BAR. The two pair of global buses 360 and 365 couple memory bank 300, memory bank 330, and cache bank 350 to the respective local buses 305, 335, and 355 via access transistors 310 and 315; 340 and 345; and 370 and 375, respectively.

The memory array may be divided into subarrays, such as memory banks 300 and 320. Each subarray has local buses to access a memory cell. A sense amplifier may be associated with each local bus pair to amplify the charge of the memory cell and facilitate writing back data, or refreshing, the memory cell when the read of the memory cell may be destructive read such as for DRAM. The value of the memory cell may be restored during a refresh that is a self refresh or during a read. The self refresh may comprise reading to the local bus without passing the contents to a global bus so local access transistors are off during the self refresh. On the other hand, during a read operation, a refresh may occur in conjunction with passing the contents of a memory cell to a global bus. Further, a write operation may pass the contents of a global bus to a local bus to write the contents of the global bus into a memory cell.

In the present embodiment, the more than two global buses may be designed to facilitate swapping memory in accordance with instructions from a memory controller. For example, when a write access is requested and a refresh is pending for memory bank 330, memory controller may flush from cache bank 350 to memory bank 300, write the data of the access to a cache line, and refresh memory bank 330 substantially simultaneously. Access transistors 340 and 345 may be off during refresh of memory bank 330. Global bus pair 360 may be coupled to local bus pair 355 via access transistors 370 during the early part of a cycle to read data from cache bank 350. After the read phase of the cycle places data on global bus pair 360, access transistors 370 turn off read access to global bus pair 360 and turn on write access to global bus pair 365 via access transistors 375. Turning on write access to global bus pair 365 may facilitate writing data to a cache line in response to the requested write access in a different phase of the same cycle so the memory bank 330 may be refreshed without increasing the latency of the requested write access.

In some embodiments, the more than two global buses may also facilitate reading from one bank, writing to cache, reading from cache, and writing to another bank substantially at the same time. For example, data may be read from memory bank 300 and placed on bus 365 B2 and B2 BAR. At substantially the same time, a read from cache may be placed on global bus pair 360 B1 and B1 BAR. In the later phase of the same cycle, cache bank 350 may disconnect read access for global bus pair 360 and write the data from global bus pair 365 to a cache line. The data on global bus pair 360 may substantially simultaneously be written to memory bank 330 during the same cycle.

Many embodiments of the more than two global buses comprise more than two pair of global buses coupling more than two memory banks 300 and 330 to one or more caches such as cache bank 350. In further embodiments, a combination of two global bus pairs in a global bus coupled to XOR logic, such as it is shown in FIG. 4, may be used.

Referring now to FIG. 4 there is shown an alternate more than two global buses. The more than two global buses in FIG. 4 may couple memory bank 400, memory bank 420, and cache bank 450 via local bit lines in each memory bank 410, 430, and 470. More than two global buses may comprise one global pair of buses B1 and B1 BAR and a third global bus 480 coupled to global bus B1 BAR of the global bus pair via a circuit comprising XOR logic 440.

Similar to the more than two global buses in FIG. 3, more than two global buses in FIG. 4 may perform two reads and two writes during a single cycle. The more than two global buses accommodates two reads and two writes during a cycle when a cache bank 450 is involved with a read and a write, two reads, or two writes. For example, when it is desirable to swap memory between memory bank 400 and cache bank 450 and swap memory between cache bank 450 and memory bank 400, cache 450 may read data and place the data on local bus pair 470 and memory bank 400 may place a representation of a read on the global bus pair 465 via access transistors 417. Substantially simultaneously, circuitry 440 may compare the contents of local bus pair 470 to global bus pair 465. During another phase of the same cycle, when global bus pair 465 comprises the same data as local bus pair 470, the data from cache bank 450 may be written into memory bank 400 from global bus pair 465 via access transistors 417.

Otherwise, XOR logic of circuitry 440 may write the compliment of the global bit of local bus 470, b bar, on third global bus 480 and memory bank 400 may write the compliment of the bit on global bus pair 365 via third global bus 480 and access transistors 415. In another situation, after the cache bank 450 may write the to local bus pair 470 and memory bank 400 writes to global bus pair 465, memory bank 420 may write the contents of global bus pair 365 or the compliment of the contents of global bus pair 365 via third global bus 480 and XOR logic of circuitry 440.

In some embodiments, when more than one global bus pair is used and/or more than one cache is available to store data, more than one global bus and circuit comprising XOR logic such as global bus 480 and circuitry 440 may be used to increase the number of accesses that may be performed substantially simultaneously.

Figure 5:
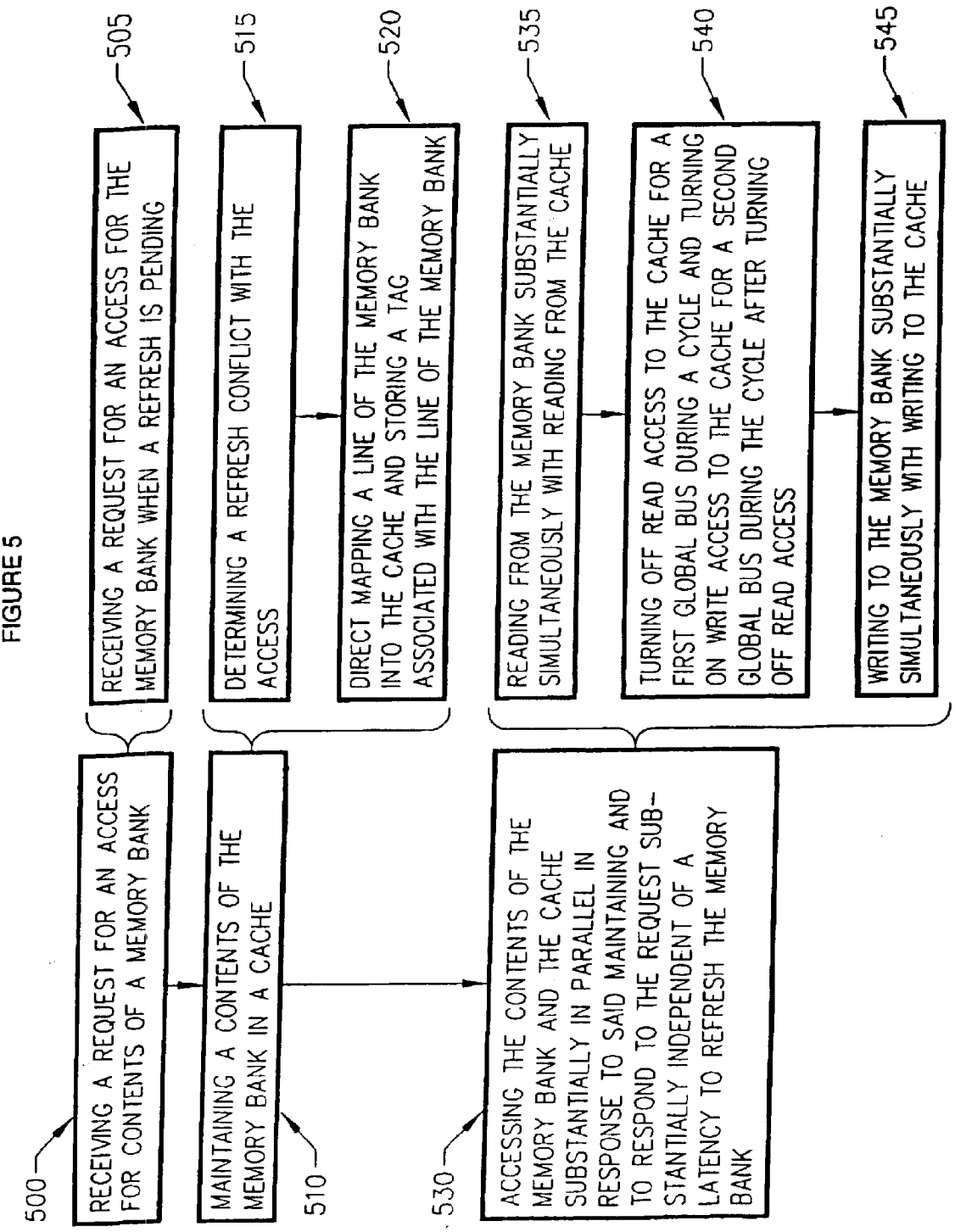
FIG. 5 depicts a flowchart of embodiments to hide refresh cycles.

Referring now to FIG. 5, there is shown a flow chart of embodiments to hide a refresh cycle. The flow chart comprises receiving a request for an access for contents of a memory bank 500, maintaining a content of the memory bank in a cache 510, and accessing the contents of the memory bank and the cache substantially in parallel in response to said maintaining and to respond to the request substantially independent of a latency to refresh the memory bank 530. Receiving a request for an access for contents of a memory bank 500 may receive a request to read data from a memory bank or write data to a memory bank. A core, or a processor via a memory controller, for example, may initiate the request.

In many embodiments, receiving a request for an access for contents of a memory bank 500 may comprise receiving an address comprising a bank address and a row address. Several embodiments comprise receiving a request for an access for contents of a memory bank 500 from a smart-caching system that recognizes certain types of frequently accessed data or instructions by a central processing unit (CPU) and stores that data in a memory bank such as a cache controller may for cache.

Receiving a request for an access for contents of a memory bank 500 may comprise receiving a request for an access when a refresh is pending 505. Receiving a request for an access when a refresh is pending 505 may comprise receiving a request for an access of a memory address wherein the memory address resides in a memory bank with a pending refresh. In addition, receiving a request for an access when a refresh is pending 505 may comprise receiving a request for data of a memory address having a cache version wherein the cache version has a pending refresh.

Maintaining a content of the memory bank in a cache 510 may comprise determining a refresh conflicts with the access 515. Determining a refresh conflicts with the access 515 may determine the conflict, determine the state of the memory banks and cache, and determine a sequence of operations to facilitate the access. Determining a refresh conflicts with the access 515 may comprise determining a refresh conflicts with a read or write request. Determining a refresh conflicts with a read or write request may comprise determining that the memory bank corresponding to the access is marked for a refresh.

Referring still to FIG. 5, maintaining a content of the memory bank in a cache 510 may further comprise determining the state of the memory banks and cache. Determining the state of the memory banks and cache may comprise comparing a tag in a tag buffer with the bank address of the access to determine when a cache comprises data from the memory bank to access. In some embodiments, determining the state of the memory banks and cache may comprise determining whether a dirty bit in a dirty bit buffer is set. When a refresh is pending, determining the state of the memory banks and cache may comprise comparing a tag from a tag buffer to a refresh pointer and/or comparing a bank address to a refresh pointer.

In addition, maintaining a content of the memory bank in a cache 510 may further comprise determining a set of operations for facilitating an access may comprise determining a read access should be written to a cache, determining a read access should be read from a cache, determining a refresh should be blocked until a read access or write access is performed on a memory bank, determining that a read from a memory bank should be performed substantially simultaneously with writing to a cache, determining a write to a memory bank should be performed substantially simultaneously with a read from the cache, etc. Determining a set of operations to facilitate an access may further comprise issuing a set of instructions to accomplish a set of operations and/or controlling the sequence of operations.

In some embodiments, maintaining a content of the memory bank in a cache 510 may comprise direct mapping a line of the memory bank into the cache and storing a tag associated with the line of the memory bank 520. Direct mapping a line of the memory bank into the cache and storing a tag associated with the line of the memory bank 520 may copy a full memory line to a cache line or copy a row of memory to a row in the cache. In addition, direct mapping a line of the memory bank into the cache and storing a tag associated with the line of the memory bank 520 may comprise storing a tag in a tag buffer to indicate the source of the memory line such as the memory bank address. The tag may be associated with the memory line in the cache, for instance, by location in the tag buffer.

Accessing the contents of the memory bank and the cache substantially in parallel in response to said maintaining and to respond to the request substantially independent of a latency to refresh the memory bank 530 may comprise reading from the memory bank substantially simultaneously with reading from the cache 535, turning off read access to the cache for a first global bus during a cycle and turning on write access to the cache for a second global bus during the cycle after turning off read access 540, and writing to the memory bank substantially simultaneously with writing to the cache 545. Reading from a memory bank substantially simultaneously with reading from the cache 535 may couple data in the memory bank to more than two global buses via access transistors during a phase of a cycle and write the data coupled to the bus through a cache line in a cache during another phase of the same cycle.

In some embodiments, reading from the memory bank substantially simultaneously with reading from the cache 535 may result from an access to read from a memory address subject to a refresh cycle. The memory address may be read via a cache to facilitate responding to a read request with a consistent latency and without affecting the latency substantially with a latency for a refresh cycle. The cache may comprise a copy of the memory line to be read, a tag indicating that the memory line is the source of the cache line, and a dirty bit indicating when the cache line is newer data or the same data as the memory line. In some embodiments, reading from a memory bank substantially simultaneously with reading from the cache 535 may facilitate storing a copy of the memory line in a cache. In many embodiments, reading from a memory bank substantially simultaneously with reading from the cache 535 may facilitate flushing a cache line and copying a memory line into cache while responding to an access.

Turning off read access to the cache for a first global bus during a cycle and turning on write access to the cache for a second global bus during the cycle after turning off read access 540 may substantially avoid incorporating a latency of a refresh in responding to a request for an access. For example, when a refresh is pending for a memory bank, the cache is full, and each line has a set dirty bit, the memory controller may copy a cache line to a corresponding line in a first memory bank, write the new data to the cache bank, set a dirty bit for the new data, write a tag for the new data, and refresh the memory bank during a single cycle. In some embodiments, the same operations may take more than one cycle.

Writing to a memory bank substantially simultaneously with writing to a cache 525 may couple the contents of a memory cell in a cache to more than two global buses during a phase of a cycle and couple that data to local bit lines of the memory bank during another phase of the same cycle. For example, a cache line may be flushed, data may be written to a memory bank, and a refresh counter may be updated substantially within the same cycle.

Further, writing to a memory bank substantially simultaneously with writing to a cache 525 may result from an access to write to a memory address subject to a refresh cycle. The access may either write to a cache, marking a cache line with a tag and a dirty bit, or write directly to the memory line in the memory bank. In some embodiments, writing to a memory subject to a refresh cycle may comprise blocking a refresh cycle until a write to memory may be completed.

Referring now to FIGS. 6A through 6F, there is shown detailed examples of flow charts for embodiments. Further, FIGS. 7A through 7F show detailed example embodiments of pseudo code for the flow charts in FIGS. 6A through 6F, respectively. FIG. 7A also comprises example definitions for inputs, buffers, and functions along with the example pseudo code for the flow chart of FIG. 6A.

In particular FIGS. 6A through 6F provides detailed examples of flow charts for embodiments for receiving a request for an access, maintaining a content of a memory bank in cache, and accessing. The embodiment may be designed to function on a memory system wherein the cache bank comprises the same number of rows as the memory banks and the rows of the memory bank are directly mapped into the cache. The direct mapping may split the cache lines by row such that nth row of a memory bank may be mapped into the nth row of the cache. For example, if a memory bank comprises ten rows, the cache bank also comprises ten rows and the first row of each memory bank may compete to be cached in the first row of the cache bank. Similarly, the second, third, . . . tenth row of each memory bank must compete with the second, third, . . . tenth row of the other memory banks to be cached in the cache bank.

Figure 6B:
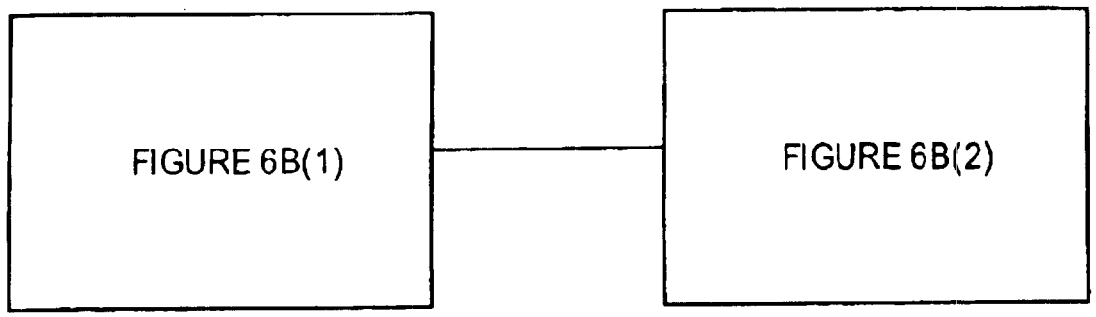

In FIG. 6A, a read access has been received and a determination of whether a refresh conflicts with the access has determined that no refresh is pending. When no refresh is pending during an access, a memory controller may be determine actions to take to avoid a conflict in a subsequent access. For instance, the memory controller may determine that cache lines of a cache should be flushed while performing the access. Further, the memory controller may initiate a sequence of actions to flush the cache line while avoiding a conflict with the access. A legend 640A describes actions implemented in the flow charts of FIGS. 6A through 6C. The legend comprises a "read" to read the row being accessed in the memory bank, a "read cache" to read the cache version of the row being accessed; an "update cache" to write the row from the memory bank being accessed into the cache and substantially simultaneously store a cache tag for the entry, a "flush" to copy the cache version of a row into the corresponding bank being accessed substantially simultaneously with clearing the dirty bit for the row, a "refresh" to refresh the row marked as refresh pending and a "block refresh" to prevent the refresh of a row until an action may be completed.

After determining that the access is a read and that no refresh is pending, a memory controller may determine whether any cache lines are marked as dirty 610A. A dirty cache line may result from an access to the memory bank during a refresh cycle that was stored in cache rather than the memory bank and maintaining a content of the memory bank in a cache may update the corresponding memory bank while processing the present access. When there are no dirty lines in cache, memory controller may do a read and update cache substantially simultaneously 612A. Similarly, when there are dirty lines in cache, maintaining a content of the memory bank in a cache may comprise determining if the row being accessed is not a dirty line 620A and when the row being accessed is not a dirty line, maintaining a content of the memory bank in a cache may initiate a read and update of cache substantially simultaneously 622A.

On the other hand, when the row being accessed is a dirty line, maintaining a content of the memory bank in a cache may comprise determining if the bank being accessed is in cache 630A and when the bank being accessed is in cache, maintaining a content of the memory bank in a cache may comprise performing a read of the cache substantially simultaneously with a flush 632A. The read of the cache may respond to the access with updated contents for the memory line and the flush may clear a dirty bit for a cache line so the cache is not full of cache lines having set dirty bits during a subsequent access. However, when the dirty line is not for the memory bank being accessed, maintaining a content of the memory bank in a cache may comprise reading the bank being accessed substantially simultaneously with flushing the dirty line in cache to the corresponding memory bank 634A.

Referring now to FIG. 6B, 6B(1), and 6B(2), there is shown a flow chart of detailed embodiments in a situation where an access request is received while a refresh is pending but the refresh is not pending for the cache bank 600B. The embodiment may begin by reviewing the dirty bits buffer to determine if the cache comprises a cache line that has more current data than its corresponding memory line in a memory bank 610B. When the cache does not have any dirty lines, the memory controller may determine compare the address bank of the access to the bank address for the refresh pointer. When the pointer may be pointing to another bank, maintaining a content of the memory bank in a cache may do a read of the bank substantially simultaneously with a refresh of the other bank 612B.

Otherwise, when the access address matches the bank address of the refresh pointer, maintaining a content of the memory bank in a cache may do a read of the cache substantially simultaneously with a refresh of the memory bank 614B when there is a copy of the memory line being accessed in cache, e.g. the address of the access matches an address of a tag associated with a cache line. Otherwise, the memory controller may determine if the row being accessed is the row marked with refresh pending. When the row being accessed is the row marked with refresh pending, maintaining a content of the memory bank in a cache may do a read and update the cache 616B. Otherwise, maintaining a content of the memory bank in a cache may block the refresh for the memory bank being accessed while reading the memory bank and updating the cache 618B.

When there is a dirty line in a cache 610B, maintaining a content of the memory bank in a cache may comprise determining whether the bank marked for refresh is the bank being accessed 630B. When the bank marked for refresh is not the bank being accessed, there may be four possibilities and each possibility may include performing a refresh of the bank substantially simultaneously with one or more operations 632B. The first possibility may be when the bank stored in the cache is not being accessed and the row being accessed is a dirty line then the more than two global buses may facilitate doing a read of the memory bank being accessed substantially simultaneously with a flush of the dirty line in the cache 634B. The second possibility may be when the row being accessed is not a dirty line, so the more than two global buses may perform a read and update of the cache substantially simultaneously 634B.

The third possibility may be when the bank stored in the cache is the bank being accessed and the row being accessed is a dirty line wherein maintaining a content of the memory bank in a cache may cause the more than two global buses to facilitate a read of the cache substantially simultaneously with a flush of the cache 636B. The fourth possibility may be when the row being accessed is not a dirty line wherein the more than two global buses may perform a read of the memory bank 636B.

In a situation where the cache comprises at least one dirty line and the bank address for the access may be the same as the bank address for the refresh pointer, the memory controller may determine if the row to be refreshed is the same as the row being accessed 640B. When the row being accessed is the row to be refreshed and the bank stored in a cache is not the bank being accessed 642B, the more than two global buses may perform a flush of the cache substantially simultaneously with a read and update the refresh counter for the bank when the row being accessed has a corresponding dirty line or do a read of the memory bank, update the cache and update the refresh counter for the memory bank when the row being accessed does not have a corresponding dirty line 644B.

On the other hand, when the row to be refreshed is the same as the row being accessed 642B, the bank stored in the cache is the bank being accessed 646B, and the row being accessed has a corresponding dirty line then memory controller may cause the more than two global buses to flush the dirty line in cache substantially simultaneously with a read of the cache and an update of the refresh counter 646B. Otherwise, when the row being accessed does not have a corresponding dirty line in cache, the more than two global buses may facilitate reading the memory bank, updating the cache, and updating the refresh counter 646B.

Referring still to FIG. 6B(2), when the bank marked for refresh is the same as the bank being accessed, the row to be refreshed is not the same as the row being accessed, and the bank being accessed is stored in cache then a refresh of the bank may be performed substantially simultaneously with a read of cache 650B. However, when the bank being accessed is not stored in cache then the refresh may be blocked substantially simultaneously with flushing the cache and reading the bank being accessed 652B when the row being accessed is a dirty line. On the other hand, when the bank being accessed is not stored in the cache and the row being accessed is not a dirty line 652B, maintaining a content of the memory bank in a cache may comprise reading the memory bank being accessed, updating cache, and updating the refresh counter for the memory bank.

Figure 6C:
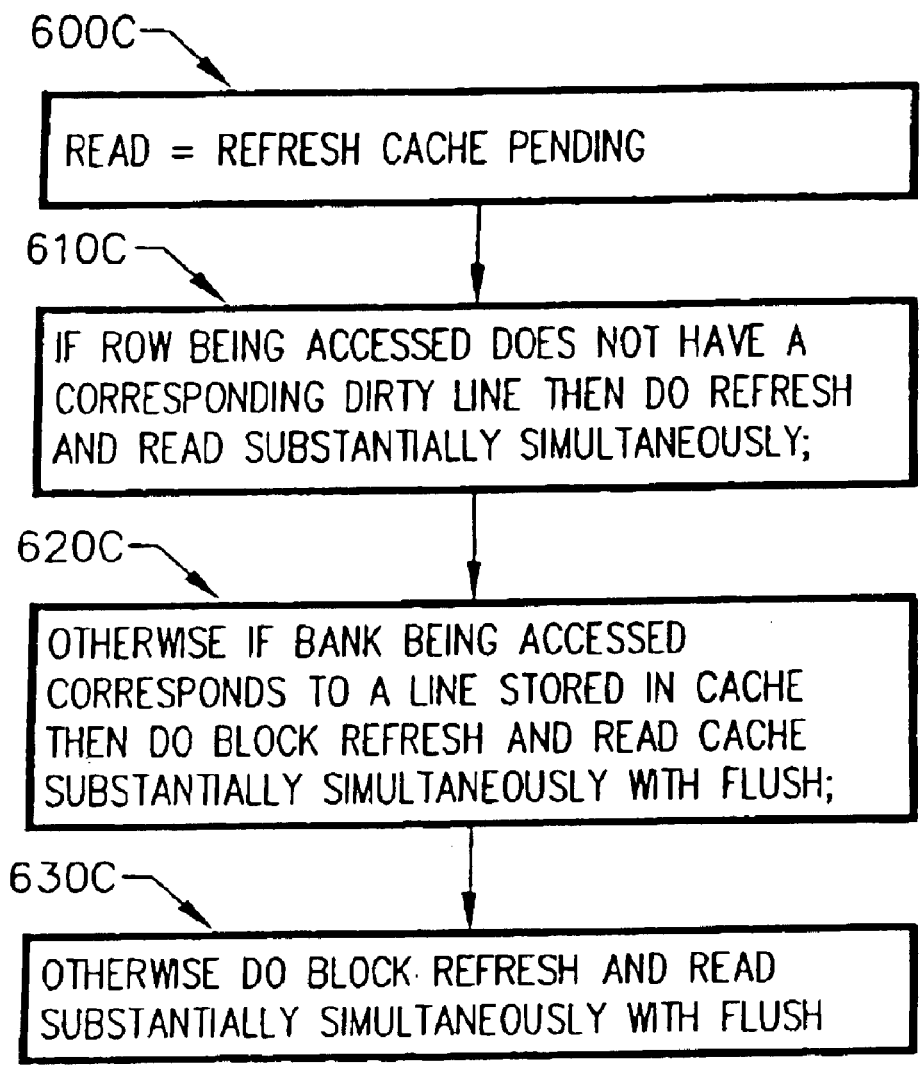

Referring now to FIG. 6C, there is shown a detailed flow chart of embodiments when access is a read and a refresh is pending for the cache 600C. When the row being accessed does not have a corresponding dirty line in cache then the memory controller may block a refresh of the memory bank substantially simultaneously with reading the memory bank 610C. Otherwise, if the bank being accessed does have a corresponding dirty line stored in the cache, maintaining a content of the memory bank in a cache may comprise blocking a refresh and reading a cache substantially simultaneously with flushing the cache 620C. Otherwise, when the row being accessed does not have a corresponding dirty line and the bank being accessed is not stored in cache, the memory controller may block a refresh of the memory bank and read the memory bank substantially simultaneously with flushing the cache 630C.

Referring now to FIG. 6D, there is shown a legend 640D for FIGS. 6D, E. and F, comprising example instructions for operations referred to in the detailed flow charts. The legend 640D comprises a "write" to write to the row being accessed in the memory bank, a "write cache" to write to the cache a version of the row being accessed, an "update cache" to copy the row from the memory bank being accessed into the cache and substantially simultaneously storing a cache tag for the entry, a "refresh" to refresh the row marked as refresh pending, and a "block refresh" to block refresh while executing an operation on the memory line subject to the refresh.

Referring still to FIG. 6D, there is shown a detailed flow chart of embodiments to handle a write access when no refresh is pending 600D. The first operation may comprise determining if a dirty bit is set in the dirty bit buffer associated with the cache bank 610D and when no dirty bits are set, perform the write to the cache 612D. On the other hand, when a dirty bit is set in the cache (not necessarily dirty bits for the row being accessed or even the memory banks being accessed), the memory controller may determine whether the row being accessed is a dirty line 620D. When the row being accessed does not have a corresponding dirty line, the memory controller may determine that the write should be performed on the memory bank 622D. However, when the row being accessed does have a corresponding dirty line, memory controller may determine whether the bank stored in the cache is the bank being accessed 630D and when the bank stored in cache is the bank being accessed then the memory controller may determine that maintaining a content of the memory bank in a cache comprises writing to both the memory line and the line in cache and clearing the dirty bit 634D. Otherwise, when the bank stored in a cache is not the bank being accessed, more than two global buses may facilitate a write to the bank substantially simultaneously with a flush of the cache marked by the dirty bit 632D.

Figure 6E:
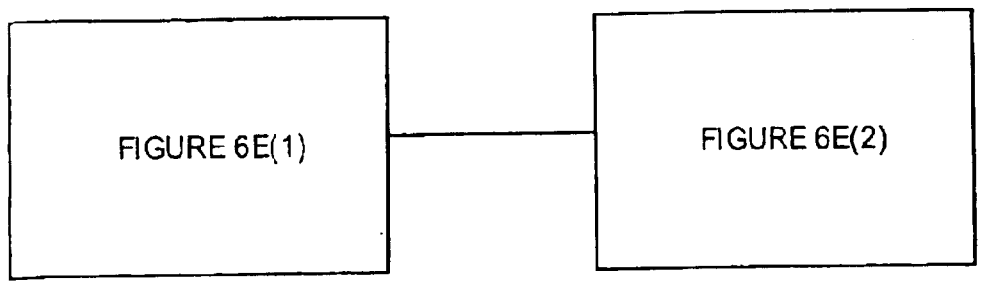

Referring now to FIG. 6E, 6E(1), and 6E(2), there is shown an example of a detailed flow chart of embodiments when an access is a write access and there is a refresh pending on one of the memory banks that is not a cache 600E. The flow chart may begin with a determination of whether there is a dirty bit set in the dirty bit buffer associated with a cache 610E. When there is a dirty bit set, memory controller may determine whether the bank marked for refresh is not the bank being accessed 620E. When the bank marked for refresh is the same as the bank being accessed 630E, maintaining a content of the memory bank in a cache may determine when the row being accessed is not a dirty line 640E and cause the more than two global buses to perform a refresh substantially simultaneously with a write cache 642E.

On the other hand, when the bank marked for refresh is the same as the bank being accessed and the row being accessed is a dirty line, maintaining a content of the memory bank in a cache may determine whether there is a copy of the bank being accessed in cache 644E. When there is a copy of the bank being accessed in cache, the more than two global buses may perform a write to cache 646E.

After a memory controller determines that the bank marked for refresh is the same as the bank being accessed, the row being accessed is a dirty line, there is a copy of the bank being accessed in cache, and the row marked for refresh is the same as the row being accessed, maintaining a content of the memory bank in a cache may determine a set of operations comprising performing a flush substantially simultaneously with a write and update the refresh counter for the bank being accessed 648E. If the row marked for refresh is not the same as the row being accessed then the more than two global buses may perform a flush and write to cache substantially simultaneously with a refresh 649E. The flush, write to cache, and refresh may be performed during the same cycle. For example, the refresh may begin on a first memory bank and a read from the cache may occur during a first number of phases in a cycle. During a second number of phases, the data from the read may be written to a second memory bank and the dirty bit for the cache line may be cleared.

The detailed flow chart shows that when there is a dirty bit in the dirty bits buffer and the bank marked for refresh is not the bank being accessed, maintaining a content of the memory bank in a cache may determine there is no cache line in the cache having a source in the bank marked for refresh 622E. When the bank marked for refresh is a source of a cache line in a cache and when a copy of the row being accessed in the cache is dirty, more than two global buses may refresh substantially simultaneously with a write 623E. Otherwise, the more than two global buses may refresh substantially simultaneously with a write or write both 623E.

When the bank marked for refresh is a source of a cache line, maintaining a content of the memory bank in a cache may determine that a refresh should be done substantially simultaneously with one of the following 624E four operations or combination of operations. First, when the row being accessed has a corresponding dirty line 626E and a copy of the bank being accessed is not in a cache then the more than two global buses may flush the dirty line substantially simultaneously with writing to the memory bank 630E. Second, when the row being accessed has a corresponding dirty line and when a copy of the bank being accessed is in the cache, the more than two global buses may perform a write both 630E. Third, when the row being accessed does not have a corresponding a dirty line and when a copy of the bank being accessed is not in the cache then the more than two global buses may write or write both 628E. Fourth, when the row being accessed does not have a corresponding dirty line and when a copy of the bank being accessed is in the cache then the more than two global buses may write both 628E.

Finally, the detailed flow chart further shows that after reviewing the contents of the dirty bits buffer 610E and finding no dirty bits in the dirty bits buffer, a write may be performed substantially simultaneously with a refresh when the bank being accessed is not the bank marked for refresh 650E. Otherwise, writing to cache and setting a dirty bit may be performed substantially simultaneously with a refresh 652E.

Figure 6F:
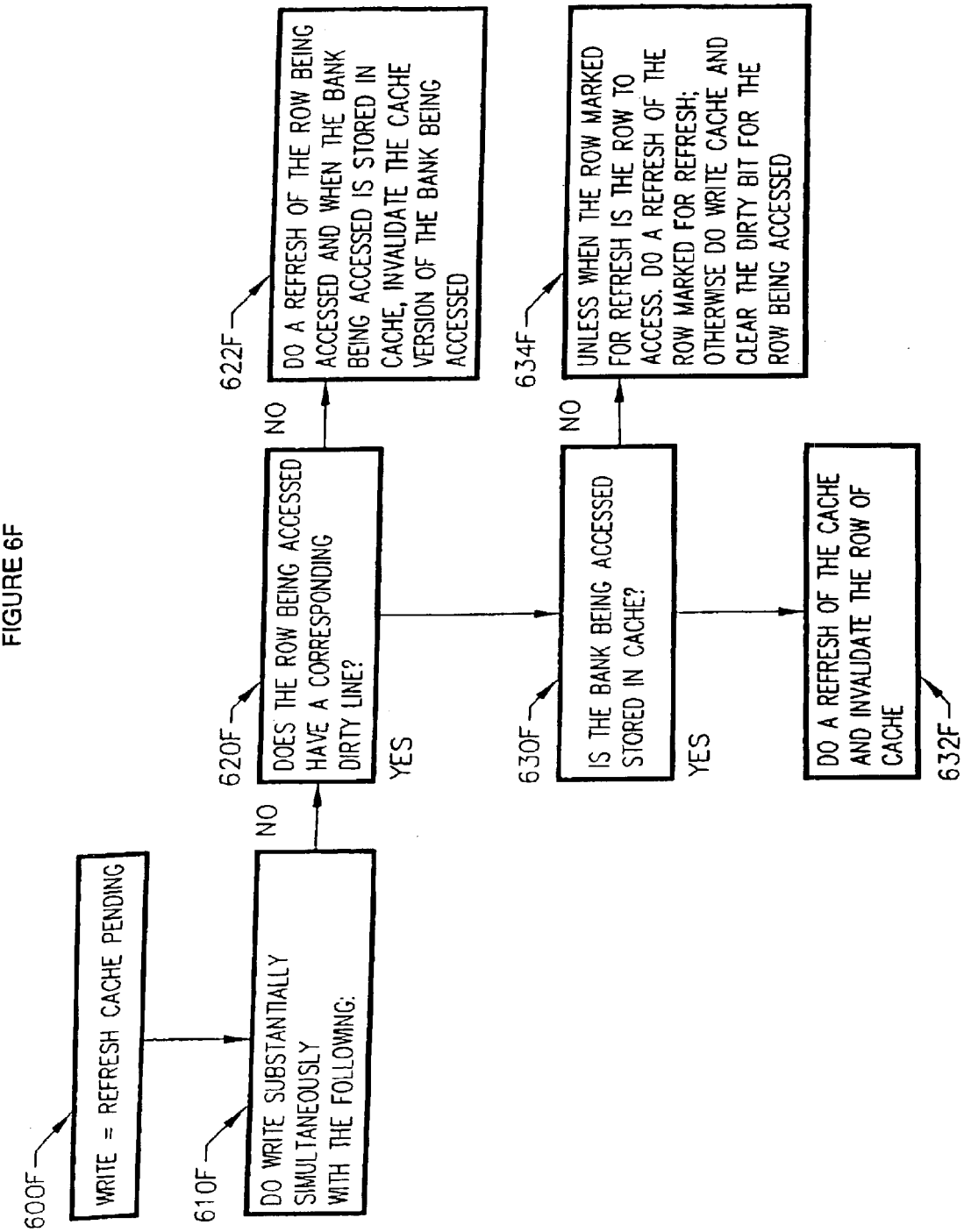

Referring now to FIG. 6F, there is shown a detailed flow chart of embodiments wherein a write access is requested of a memory bank and a refresh of the cache is pending 600F. The flow chart may begin with maintaining a content of the memory bank in a cache comprising determining a write may be performed substantially simultaneously with one of four other sets of operations 610F. Maintaining a content of the memory bank in a cache may determine whether the row being accessed has a corresponding dirty line 620F and when the row being accessed does not have a corresponding dirty line, memory controller may do a refresh of the row being accessed. Further, when the bank being accessed is stored in cache and the memory controller may invalidate the cache version of the bank being accessed 622F. When the row being accessed has a corresponding dirty line and the bank being accessed is stored in cache, the memory controller may determine that the more than two global buses may perform a refresh of the bank and invalidate the copy of the bank in cache 632F. However, when the bank being accessed is not stored in cache 630F, the more than two global buses may do a refresh of the row being accessed unless the row marked for refresh is the row being accessed. Otherwise, when the row marked for refresh is the row being accessed, the more than two global buses may write cache and include the dirty bit for row being accessed 634F.

Referring now to FIG. 8, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc . . . Several embodiments of the present invention may comprise more than one machine-readable medium depending on the design of the machine.

The machine-readable medium 800 may comprise instructions for receiving a request for an access for contents of a memory bank 810, maintaining a content of the memory bank in a cache 820, and accessing the contents of the memory bank and the cache substantially in parallel in response to said maintaining and to respond to the request substantially independent of a latency to refresh the memory bank 840. Receiving a request for an access for contents of a memory bank 810 may comprise receiving a request to read or write, wherein the request may be accompanied with a bank address indicating a memory bank that may or may not be subject to a refresh.

Instructions for maintaining a content of the memory bank in a cache 820 may comprise instructions for direct mapping contents of a memory bank into a cache. Direct mapping contents of a memory bank into a cache may comprise copying an entire memory line to an equivalent size memory line in a cache and associating a tag with the cache line to indicate the source of the cache line.

In some embodiments, instructions for maintaining a content of the memory bank in a cache 820 may comprise an implementation of the locality of reference principle. The locality of reference principle indicates that when a processor or processor core recently referred to a location in memory, the processor or core may refer to that location in the near future. Thus, copying a memory line from a memory bank substantially simultaneously with reading from that memory line of the memory bank may facilitate the completion of the refresh and access to the memory contents of the memory bank. Copying substantially simultaneously with reading may be particularly useful when the memory bank is subject to a refresh so long as sufficient time is maintained to refresh the memory bank.

Further, instructions for maintaining a content of the memory bank in a cache 820 may comprise determining a refresh conflicts with the access. Instructions for determining a refresh conflicts with the access may begin an operation by determining a memory bank associated with the bank address, the contents of a tag buffer associated with a cache, and whether or not a memory bank or cache is subject to a refresh. In some embodiments, determining a refresh conflicts with the access may comprise issuing instructions to cause more than two global buses to read from a cache line and write the line to a memory bank during the same cycle as a read of a second line from a second memory bank and a write of the second line to the cache. The instructions may cause the more than two global buses to facilitate the reads and writes with instructions to modify the state of access transistors coupled between the more than two global buses and local bit lines of the cache.

In many embodiments, determining a refresh conflicts with the access may comprise causing access transistors for a local bit line pair to decouple the local bit line pair from one pair of global buses and coupled the local bit line pair to a second pair of global buses. Further, determining a refresh conflicts with the access may comprise facilitating an access of a read to a memory line by reading from a cache line having a source of the memory line of the memory bank being accessed.

Referring still to FIG. 8, instructions for accessing the contents of the memory bank and the cache substantially in parallel in response to said maintaining and to respond to the request substantially independent of a latency to refresh the memory bank 840 may comprise instructions for writing to a memory bank subject to a refresh cycle and reading from a memory bank subject to a refresh cycle via a cache. Writing to memory subject to a refresh cycle may comprise writing over the memory subject to the refresh in lieu of refreshing the memory. In other situations, writing to memory subject to a refresh cycle may comprise writing to a line in cache and writing a tag to a tag buffer substantially simultaneously with setting a dirty bit to indicate that the cache version of a memory line or address may be newer than the memory line. Reading from a memory address subject to a refresh cycle via cache may comprise reading a cache line when a tag associated with the cache line indicates that the cache comprises the contents of the memory address.

Further, instructions for accessing the contents of the memory bank and the cache substantially in parallel in response to said maintaining and to respond to the request substantially independent of a latency to refresh the memory bank 840 may comprise reading from a memory bank substantially simultaneously with writing to a cache and writing to a memory bank substantially simultaneously with reading from a cache. Reading from a memory bank substantially simultaneously with writing to a cache may comprise blocking a refresh to perform a read access on a memory bank when the row of the memory bank to be accessed does not have a corresponding copy in a cache. Blocking a refresh to perform a read access may be governed by instructions for maintaining a content of the memory bank in a cache 820. Instructions for accessing the contents of the memory bank and the cache substantially in parallel in response to said maintaining and to respond to the request substantially independent of a latency to refresh the memory bank 840 may comprise instructions to read from a memory bank and read from the cache substantially in parallel, as well as a write to the same memory bank and cache substantially in parallel via more than two global buses.

What is claimed is:

1. An apparatus comprising:
   a cache to provide access to contents of a memory bank;
   more than two global buses to provide parallel access to said cache and the memory bank, wherein the more than two global buses comprise a pair of global buses coupled to the cache to transmit a bit, a third global bus coupled to the cache to transmit a signal representing a second bit, and circuitry to write the second bit to the cache via at least one bus of the pair of global buses in response to a comparison of the signal to the bit; and a cache controller to maintain a content of the memory bank in said cache via parallel access of said cache and the memory bank to respond to a request for an access of the memory bank substantially independent of a latency to refresh the memory bank.

2. The apparatus of claim 1, further comprising:

a tag buffer coupled to said cache to associate a cache line with a line of the memory bank; and a row decoder coupled to the tag buffer to decode a tag stored in the tag buffer.

3. The apparatus of claim 1, further comprising a dirty bit buffer coupled to said cache to indicate a relationship between a line of the cache and a line of the memory bank.

4. The apparatus of claim 1, wherein the memory bank comprises dynamic random access memory.

5. The apparatus of claim 1, wherein said cache comprises at least part of a second memory bank.

6. The apparatus of claim 1, wherein the circuitry to write comprises circuitry implementing XOR logic coupled to the third global bus and to said cache.

7. The apparatus of claim 1, wherein said more than two global buses comprises two pair of global buses coupled to the memory bank and said cache.

8. The apparatus of claim 1, wherein said cache controller comprises circuitry to read from the memory bank and from said cache substantially simultaneously.

9. The apparatus of claim 1, wherein said cache controller comprises circuitry to write to the memory bank and to write to said cache substantially simultaneously.

10. An apparatus comprising:

a cache to provide access to contents of a memory bank;

more than two global buses to provide parallel access to the cache and the memory bank; and a cache controller to maintain a content of the memory bank in the cache via parallel access of the cache and the memory bank to respond to a request for an access of the memory bank substantially independent of a latency to refresh the memory bank, wherein said cache controller comprises circuitry to turn on write access to said cache via a first global bus of said more than two global buses during a write-back phase of a cycle in response to turning off read access to said cache via a second global bus of said more than two global buses after a read phase of the cycle.

11. A system, comprising:

a core; and a first cache coupled to the core, said first cache comprising a second cache to provide access to contents of a memory bank;

more than two global buses to provide parallel access to the second cache and the memory bank, wherein the more than two global buses comprise a pair of global buses coupled to the second cache to transmit a first bit, a third global bus coupled to the second cache to transmit a signal representing a second bit, and circuitry to write the second bit to the second cache via at least one bus of the pair of global buses in response to a comparison of the signal to the first bit; and a cache controller to maintain a content of the memory bank in the second cache via parallel access of the second cache and the memory bank to respond to a request for an access of the memory bank substantially independent of a latency to refresh the memory bank.

12. The system of claim 11, wherein the more than two global buses comprises two pair of global buses coupled to the memory bank and the second cache.

13. The system of claim 11, wherein the cache controller comprises:

circuitry to read from the memory bank and from the second cache substantially simultaneously; and circuitry to write to the memory bank and to write to the second cache substantially simultaneously.

14. A system comprising:

a processor; and a memory device coupled to said processor, said memory device comprising a cache to provide access to contents of a memory bank;

more than two global buses to provide parallel access to the cache and the memory bank, wherein the more than two global buses comprise a pair of global buses coupled to the cache to transmit a bit, a third global bus coupled to the cache to transmit a signal representing a second bit, and circuitry to write the second bit to the cache via at least one bus of the pair of global buses in response to a comparison of the signal to the bit; and a cache controller to maintain a content of the memory bank in the cache via parallel access of the cache and the memory bank to respond to a request for an access of the memory bank substantially independent of a latency to refresh the memory bank.

15. The system of claim 14, wherein the cache controller comprises:

circuitry to read from the memory bank and from the cache substantially simultaneously; and circuitry to write to the memory bank and to write to the cache substantially simultaneously.

* * * * *